United States Patent [19]
Wilson et al.

[11] Patent Number: 5,386,360
[45] Date of Patent: Jan. 31, 1995

[54] PERIPHERAL DATA ACQUISITION, MONITOR, AND ADAPTIVE CONTROL SYSTEM VIA PERSONAL COMPUTER

[75] Inventors: Dennis A. Wilson, McHenry; Mark S. Williamsen, Crystal Lake, both of Ill.

[73] Assignee: Ansan Industries Ltd., Rockford, Ill.

[21] Appl. No.: 862,624

[22] Filed: Apr. 1, 1992

Related U.S. Application Data

[63] Continuation-in-part of Ser. No. 832,716, Feb. 7, 1992, Pat. No. 5,220,522, which is a continuation of Ser. No. 350,115, May 9, 1989, Pat. No. 5,099,444.

[51] Int. Cl.⁶ .................... G05B 11/01; G06F 3/00
[52] U.S. Cl. .................... 364/146; 364/188; 364/709.09
[58] Field of Search ............ 364/138, 146, 147, 188, 364/189, 550, 551.01, 709.02, 709.09; 340/706, 711, 712

[56] References Cited

U.S. PATENT DOCUMENTS

| | | | |
|---|---|---|---|
| 3,654,449 | 4/1972 | Boyce | 364/709.11 |
| 3,898,643 | 8/1975 | Ettlinger | 364/189 |
| 3,955,073 | 5/1976 | Carew et al. | 364/561 |
| 3,961,168 | 6/1976 | Gaffney | 235/152 |
| 3,971,000 | 7/1976 | Cromwell | 364/138 |
| 4,084,249 | 4/1978 | Schlick | 364/709.01 |
| 4,101,883 | 7/1978 | Hempenius et al. | 341/22 |
| 4,151,596 | 4/1979 | Howells | 364/709.11 |
| 4,181,959 | 1/1980 | Tateishi | 364/709.11 |
| 4,181,960 | 1/1980 | Tateishi et al. | 364/709.11 |
| 4,195,348 | 3/1980 | Kakutani | 364/709.11 |
| 4,201,908 | 5/1980 | Johnson et al. | 377/9 |
| 4,213,035 | 7/1980 | Washizuka et al. | 364/709.12 |
| 4,250,554 | 2/1981 | Blum et al. | 364/560 |
| 4,303,973 | 12/1981 | Williamson, Jr. et al. | 340/722 |
| 4,370,727 | 1/1983 | Bellet | 364/709.13 |
| 4,371,922 | 2/1983 | Fujita et al. | 364/146 |
| 4,379,336 | 4/1983 | Yamamoto et al. | 364/708 |
| 4,396,977 | 8/1983 | Slater et al. | 364/138 |
| 4,418,333 | 11/1983 | Schwarzbach et al. | 364/146 |
| 4,480,312 | 10/1984 | Wingate | 364/557 |
| 4,621,334 | 11/1986 | Garcia | 364/550 |
| 4,641,262 | 2/1987 | Bryan et al. | 364/900 |
| 4,663,704 | 5/1987 | Jones et al. | 364/146 |
| 4,669,053 | 5/1987 | Krenz | 364/708 |
| 4,695,833 | 9/1987 | Ogura et al. | 340/722 |
| 4,704,604 | 11/1987 | Fuhs | 364/708 |
| 4,710,869 | 12/1987 | Enokizono | 364/709.09 |
| 4,755,808 | 7/1988 | Bullock et al. | 340/709 |
| 4,779,079 | 10/1988 | Hauck | 340/706 |
| 4,782,448 | 11/1988 | Milstein | 364/709.11 |
| 4,821,221 | 4/1989 | Kaneko | 364/710.13 |

(List continued on next page.)

FOREIGN PATENT DOCUMENTS 2125996 3/1984 United Kingdom .

OTHER PUBLICATIONS

Ansan Industries, Ltd., "I/O Port System ™" Sale Brochure, 1990, 4 pgs. Month unknown.

Ansan Industries, Ltd., "I/O Port System ™ Bridge" User's Manual, 1990, 78 pgs. Month unknown.

Apple Computer, Inc., *Inside Macintosh*, 1988, vol. III, pp. 29–32; vol. IV, pp. 250; & vol. V, pp. 361–373. Month unknown.

(List continued on next page.)

*Primary Examiner*—Paul Gordon
*Attorney, Agent, or Firm*—Welsh & Katz, Ltd.

[57] ABSTRACT

A peripheral data acquisition, monitor, and adaptive control system is disclosed in which a personal computer (PC) and one or more input/output (I/O) Bridge devices interface signals from electronically-controlled devices to the PC via the keyboard port, thus permitting data, such as measurement data, to be automatically and directly entered into application programs such that the PC can take action and control outputs based upon the measurement data. A software control program is also disclosed which allows the user to configure the system for orienting the user as to which devices are being controlled, reading digital and analog inputs, making decisions based upon the information using specific user-defined conditions, and setting digital outputs. The program will also keep track of all I/O events by storing them to a disk file.

34 Claims, 25 Drawing Sheets

U.S. PATENT DOCUMENTS

| | | |
|---|---|---|
| 4,829,472 | 5/1989 | McCourt et al. ............... 364/900 |
| 4,831,568 | 5/1989 | Ito ............................ 364/709.01 |
| 4,852,031 | 7/1989 | Brasington ................... 364/578 |
| 4,852,032 | 7/1989 | Matsuda et al. .............. 364/708 |
| 4,882,684 | 11/1989 | Ishigami et al. ............. 364/708 |
| 4,885,580 | 12/1989 | Noto et al. .................. 364/709.01 |
| 4,908,612 | 3/1990 | Bromley et al. .............. 340/706 |
| 4,920,481 | 4/1990 | Binkley et al. .............. 362/200 |
| 4,935,875 | 6/1990 | Shah et al. .................. 364/709.01 |
| 4,945,473 | 7/1990 | Hotley et al. ................ 364/200 |
| 4,947,367 | 8/1990 | Chang et al. ................. 364/900 |
| 4,962,473 | 10/1990 | Crain .......................... 364/514 |
| 5,065,360 | 11/1991 | Kelly .......................... 395/800 |
| 5,099,444 | 3/1992 | Wilson et al. ............... 364/709.09 |

OTHER PUBLICATIONS

Apple Computer, Inc., "The Macintosh Family Hardware Reference", *Apple Technical Publications*, APDA Draft, Mar. 2, 1987, pp. 1, 25–29, 93–103, & 171–181.

Birse, C., "Space Aliens Ate My Mouse (ADB—The Untold Story)", *Macintosh Technical Note #206*, Feb. 1990, pp. 1–8.

Ernst, "Remotely Control a Pocket Calculator with a Simple CMOS Interface Circuit", *Electronic Design*, vol. 23, pp. 74–75, Nov. 8, 1976.

IBM Corp., "Keyboard Port Attachment", *IBM Technical Disclosure Bulletin*, vol. 28, No. 8, pp. 3358–3359, Jan. 1986.

"The Apple Desktop Bus", reprinted from *Mini–Micro Systems*, Nov. 1987, Part IV, 2 pgs.

Radio Shack ® *Plug 'n Power* TM *Wireless Remote Control Center*, Catalog No. 61-2676, Owner's Manual, pp. 1–24, 1989. Month unknown.

Silicon Valley Bus TM Co., *BusRider* TM *BC-91* TM "Bar Code ID System for Apple Desktop Bus"; *BusRider* TM *MP-91* Software Controlled Multiple Port Switch for MacIntosh TM; *BusRider* TM *BC-90* TM *Lock Box Security System for Apple Desktop Bus*; Data Sheets, 6 pages, 1991. Month unknown.

Sophisticated Circuits Inc., *Specifications and Installation Guide for PowerKey* TM, 6 pages, 1990. Month unknown.

Sophisticated Circuits Inc., "Three New Ways to Turn On Your MacIntosh!", *PowerKey* TM *Remote for the MacIntosh* TM *Computer*, 4 pages, 1991. Month unknown.

X-10 (U.S.A.) Inc., *X-10* ® *CP290 Home Control Interface*, Programming Guide for Advanced Programmers, pp. 1–35, 1991. Month unknown.

X-10 (U.S.A.) Inc., *X-10* ® *POWERHOUSE* TM *Computer Interface Model No. CP290*, Programming Guide, pp. 1–35, 1986. Month unknown.

X-10 (U.S.A.) Inc., *X-10* ® *POWERHOUSE* TM *Model CP290 Computer Interface*, Owner's Manual, pp. 1–28, 1986. Month unknown.

X-10 (U.S.A.) Inc., *X-10* ® *POWERHOUSE* TM *Software for Apple* ® *MacIntosh* TM, Owner's Manual, pp. 1–51, 1986. Month unknown.

X-10 (U.S.A.) Inc., *X-10* ® *POWERHOUSE* TM *Technical Note*, "The X-10 POWERHOUSE Power Line Interface Model #PL513 and Two-Way Power Line Interface Model #TW523", 12 pages, Revision 2.4, 1991. Month unknown.

| | | | |
|---|---|---|---|
| 3/30/92 5:19:54 PM | Bridge #1 | Analog Input #1 | Tank #4 Level = 33.51 feet |
| 3/30/92 5:19:55 PM | Bridge #1 | Analog Input #1 | Tank #4 Level = 47.32 feet |
| 3/30/92 5:19:56 PM | Bridge #1 | Analog Input #1 | Tank #4 Level = 57.31 feet |
| 3/30/92 5:19:56 PM | Bridge #2 | DIG INPUT #1- | East Door -- Front Office TURNED TRUE |
| 3/30/92 5:19:57 PM | Bridge #2 | DIG INPUT #2- | East Door -- Building #19 TURNED TRUE |
| 3/30/92 5:19:57 PM | Bridge #1 | Analog Input #1 | Tank #4 Level = 84.44 feet |
| 3/30/92 5:19:58 PM | Bridge #1 | Analog Input #1 | Tank #4 Level = 100.15 feet |
| 3/30/92 5:19:59 PM | Bridge #1 | Analog Input #1 | Tank #4 Level = 113.00 feet |
| 3/30/92 5:20:00 PM | Bridge #1 | Analog Input #1 | Tank #4 Level = 122.05 feet |
| 3/30/92 5:20:01 PM | Bridge #1 | Analog Input #1 | Tank #4 Level = 122.05 feet |

I/O Port System™ Results — 240

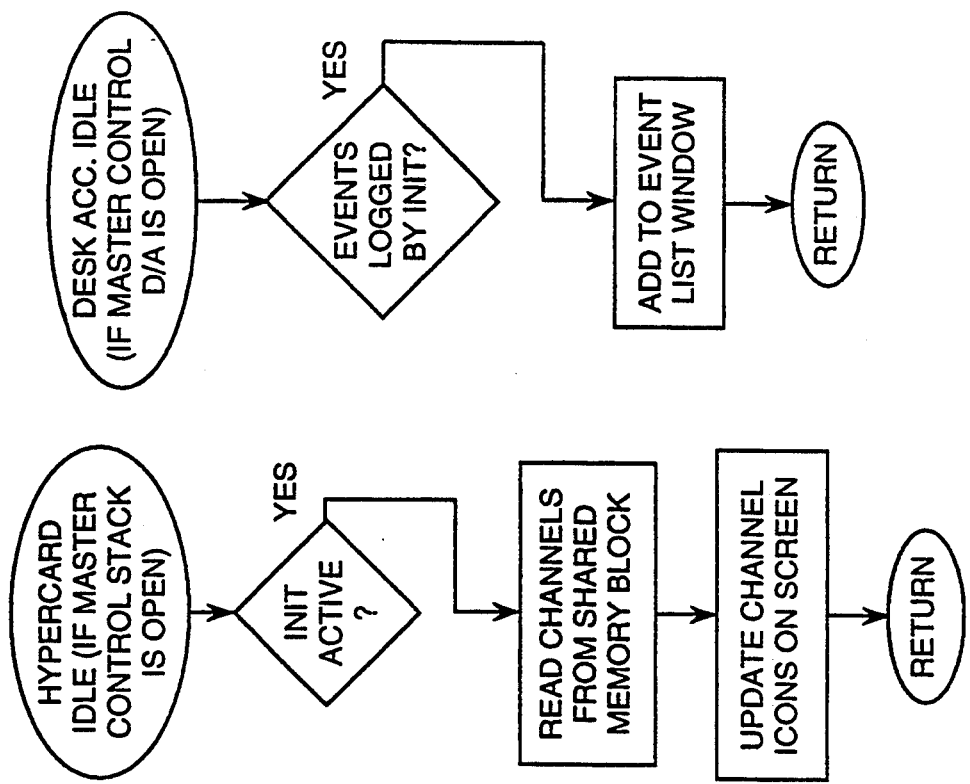
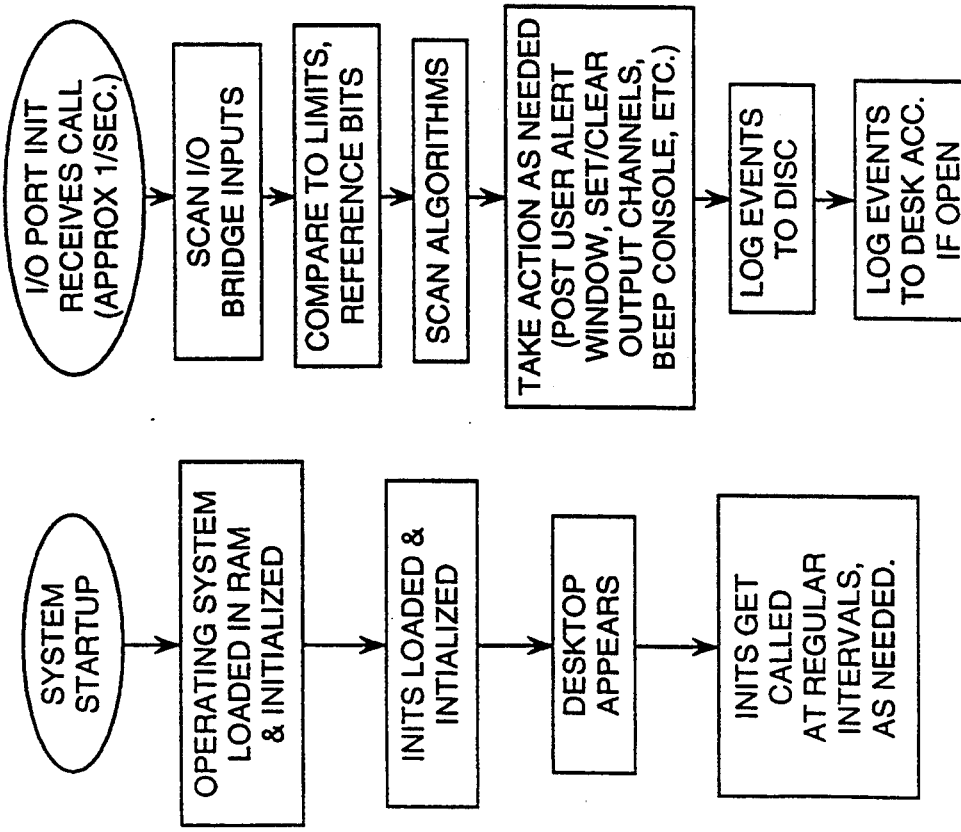
FIG. 6D
FIG. 6C
FIG. 6B
FIG. 6A

PERIPHERAL DATA ACQUISITION, MONITOR, AND ADAPTIVE CONTROL SYSTEM VIA PERSONAL COMPUTER

CROSS-REFERENCE TO RELATED APPLICATIONS

This application is a continuation-in-part of application Ser. No. 07/832,716, filed Feb. 7, 1992, now U.S. Pat. No. 5,220,522, issued on Jun. 15, 1993 which is a continuation of application Ser. No. 07/350,115, filed May 5, 1989, now U.S. Pat. No. 5,099,444, issued on Mar. 24, 1992, both of which are hereby incorporated by reference as if fully set forth herein.

REFERENCE TO COMPUTER PROGRAM APPENDIX

A computer program appendix, comprising a total of 511 pages of computer object code listing with a single page Table of Contents, is attached hereto as Appendix A, and is hereby incorporated by reference into this application as if fully set forth herein.

AUTHORIZATION TO COPY COMPUTER PROGRAM APPENDIX

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to the field of computer systems for the monitoring and controlling of peripheral devices for the purpose of data acquisition and for remote control. More specifically, the present invention relates to computer systems including a personal computer (PC) and one or more input/output peripheral data acquisition, monitor, and control devices which interface signals from electronically-controlled devices to the PC, thus permitting data, such as measurement data, to be automatically and directly entered into application programs such that the PC can take action and control outputs based upon the measurement data.

BACKGROUND OF THE INVENTION

Numerous computer software programs have been developed to provide computer control of data acquisition systems designed to automate every step in a particular process. An example of such an automated process would be a production sorting system, where products are tested under computer control to see if the products are within predetermined limits for certain parameters and, if not, to reject them. Such a computerized production sorting system tends to be expensive, bulky, and of limited utility outside of the narrow use for which it was originally designed.

There has also been a trend to develop data acquisition accessories for use with desktop computers. Many of these accessories comprise plug-in circuit cards which are connected to the personal computer's central processor unit (CPU) and are dependent upon the PC as a power source therefor. Specialized software programs must be written to instruct the circuit card to take a particular measurement and to return the data to the CPU such that the reading can either be saved on a disc storage unit or displayed on a video monitor. While these data acquisition accessories reduce the tedium associated with the reading and recording of measured values and decrease the possibility of errors in such reading and recording, they still have at least one major drawback—that of requiring specialized knowledge of the particular data acquisition system and the ability to program the CPU and the data acquisition circuit card in order to perform the desired functions.

If the peripheral data acquisition, monitor, and control system is even moderately sophisticated, a service technician, typically one who has significant experience in both computer programming and electronic control, must install the system and troubleshoot it. A further difficulty is often encountered in that existing software application programs for performing data reduction and analysis, based on the keyboard entry of data, must be modified, or even rewritten, in order to accept input from the data acquisition circuit card. Once such a system is configured and programmed by the service technician, it usually becomes very difficult or impossible for the average unskilled user to change anything in the system configuration, to test the correct operation of particular control devices in the system, or to even obtain a general understanding of the overall system operation.

For example, in the case of a security system having window and door sensors in a number of different buildings located across an office complex, a security guard, having no programming or electronics background, would typically be responsible for operating the system. In order to allow an employee into one of the doors at one of the buildings, the security guard usually has to disable either the entire system, or at least that portion of the system corresponding to that building, instead of being able to disable only that particular sensor at the door being used. Even if the security system was sophisticated enough to provide this capability, the security guard would only have a vague recollection of which door sensor in which building is being disabled, instead of being presented with a precise visual image on a display monitor of the location of that particular door sensor with respect to the physical layout of the building and/or the entire office complex. Moreover, if that particular door sensor was faulty, the security guard typically would not be provided with the capability to change the system configuration to render that door sensor inoperative and test the remaining sensors in the system once the system configuration has been changed.

Similarly, using aforementioned the example of a computerized production sorting system in a factory, it is often desirable to completely automate each step in the manufacturing process and provide data acquisition capabilities to test the manufactured product using a personal computer. In the past, this has typically required a dedicated PC to run the system using customized software specifically developed for that particular manufacturing process. If even a single one of the manufacturing steps is changed to accommodate a new product, the entire system typically must be shut down temporarily to reconfigure the system by reprogramming the software. As will be appreciated by those skilled in the art, this procedure is excessively time consuming and very costly. Furthermore, in order to perform testing by automatic data acquisition for this new product, the necessary modification of the test fixture, the system configuration, and the data acquisition application software is quite often a tremendous undertaking. It may even prove to be more cost effective for certain small jobs to have a human operator take the data acquisition measurements and manually type them in on a keyboard, rather than shutting down the system and waiting for the service technician to reconfigure it.

A need, therefore, exists for a peripheral data acquisition, monitor, and adaptive control system which addresses these deficiencies in the prior art.

OBJECTS AND SUMMARY OF THE INVENTION

Accordingly, a primary object of the present invention is to provide a peripheral data acquisition, monitor, and adaptive control system which allows the user to easily create, modify, and test complex control system configurations on a personal computer.

Another object of the present invention is to provide a method and means for orienting the user with respect to the physical location and function of the equipment being controlled by the system.

A further object of the present invention is to provide a computer software program that runs in the background while an unrelated application program runs in the foreground, wherein the background program can execute sophisticated conditional statements to control an output, record events in real time, and display a recorded table of events on command.

Yet another object of the present invention is to provide a peripheral data acquisition, monitor, and adaptive control system which interfaces to the personal computer via the keyboard port and which performs data acquisition by emulation of keyboard keystrokes.

These and other objects are achieved by the present invention, which, briefly stated, is a peripheral data acquisition, monitor, and adaptive control system including a personal computer (PC) and one or more input/output (I/O) Bridge devices which interface signals from electronically-controlled devices to the PC via the PC's keyboard port. The system permits measurement and control data to be automatically and directly entered into application programs such that the PC can take action and control outputs based upon the measurement data. Hence, "adaptive control" refers to the system's ability to respond to changing conditions in the real world, and control peripheral devices in accordance with those changes.

The system of the present invention includes a computer, including a central processor, a display monitor, and a keyboard port adapted to be coupled to a detachable keyboard, for executing at least one application software program running in the foreground under user control. The computer is adapted to communicate with the keyboard when connected to the keyboard port using a particular keycode format based upon the coding of keyboard keystroke information as individual sequential keyboard characters. The equipment being adaptively controlled provides at least one monitoring signal indicative of a particular event, wherein the monitoring signal has a signal format not directly compatible with the particular keycode format.

The system further includes an interface device for interfacing the computer to the electronically-controlled equipment using the keyboard port. The interface device receives the monitoring signal from the equipment, translates the monitoring signal into a keyboard code signal which emulates individual sequential keyboard character keystroke information and which is adapted to be interpreted by the computer as keyboard keystroke information, and transmits the keyboard code signal to the computer via the keyboard port. The control software program for the system runs in the background substantially independent from user control. The control software program instructs the computer to receive the keyboard code signal at the keyboard port and to record the keyboard code signal in memory. The system also provides the ability to have the program record events in real time and display the recorded table of events.

According to another aspect of the present invention, the software control program orients the user by showing a representation of the overall view of the system being controlled, then directs the user to the location of the individual electronically-controlled devices and/or the functions that they control, and provides the ability to set up and control the devices using various icons. In other words, the program first shows the physical location of groups of devices. Then the program shows the function of each device in the group. Finally, the status of each device is shown having the various icons change colors, shapes, and/or shading.

Furthermore, the control program of the present invention provides real-time monitoring and adaptive control of the electronically-controlled devices using three modes: (1) a set up mode, where the user can determine which inputs control which outputs; (2) an automatic mode, which displays the current status of all the inputs and outputs in real time; and (3) a manual mode, wherein the status is displayed at the same time that the user is given the opportunity to control the inputs or the outputs by overriding the input sensors. This aspect of the invention allows the user to verify the operation of the entire system through real-time emulation via manual control.

The present invention further provides the ability to set up and run "complex conditionals". In addition to emulation via manual control, the control program provides the ability to let the user set up the system using complex boolean logic condition statements with multiple inputs and multiple outputs, and then verify the operation of the conditional via emulation. Then the user can verify the operation of the system by overriding the input sensor to trigger the chain of events for that conditional to occur, and monitor the status of that output. The program further provides the ability to combine two or more independent and different levels of boolean logic condition statements, and add sophisticated time parameters as conditional statements.

As will be explained below, the input/output (I/O) Bridge device of the present invention simulates the signals produced by the keyboard of a tabulating or computing machine (or a terminal of such a machine) in such a manner that, when the I/O Bridge is connected to the keyboard port of the PC, the PC responds exactly as if keys were actually being typed upon. The I/O Bridge device generates signals corresponding to specific items of data so that the data can be entered directly into the computer.

The I/O Bridge can be used to automate data entry procedures where a human operator would normally take hundreds or thousands of measurements, records them, and then type them on a keyboard for further reduction and analysis by the PC. The I/O Bridge will automatically make the same measurements, then generate keyboard signals identical to those which would have occurred if the human operator had typed the values. The process can therefore be completely automated without changing the tabulating or computing equipment, the equipment's internal software, or other computer operations.

The software program for the PC provides for the sensing, monitoring, and controlling of numerous types of electric devices in a wide variety of applications. The program, named "MASTER CONTROL" (trademark of Ansan Industries, Ltd.), allows the average user to build complex adaptive control system configurations using the I/O Bridge devices which connect to the PC via the keyboard port. The MASTER CONTROL program uses a point-and-click environment to allow the user to readily customize the system, thus allowing both the hardware and the software to perform unlimited applications. For example, a user can utilize the MASTER CONTROL program to create a security monitoring system, an irrigation control system, and a temperature monitoring and control system for the home. All three of these systems can be monitored and controlled from a single computer using a single I/O Bridge device.

Furthermore, one or more I/O driver programs, each called an "INIT", run in the background at the same time that the user is busy with an unrelated application program in the foreground. Similarly, the MASTER CONTROL program can be used to create sophisticated background INITs for monitoring and controlling lab experiments, manufacturing lines, waste management facilities, vehicle dynamics, or even a model railroad. The background programs will also keep a running history file informing the user of any and all changes in the system.

The preferred embodiment utilizes a MACINTOSH brand computer, available from Apple Computer, Inc. The use of the MACINTOSH computer as the CPU for the control system has numerous advantages over traditional monitoring and control system processors by providing the user with graphic "soft control panels", i.e. computer-simulated monitor and control screens using representative graphical symbols or "icons" to monitor and control a wide variety of systems. The primary advantage of using soft control panels is the ability to readily customize the control system for a particular application, e.g., from a security system to a production monitor, or to change the system configuration "on the fly", e.g., to accommodate a faulty sensor. Since the computer has a built-in timekeeping capability, the user can easily instruct the system to turn on or off certain devices at predetermined times only on particular days. Furthermore, the PC can be used to make decisions based on several conditions such that the user can specify complex requirements for each application. The program will also log all the events which have occurred.

As an example of the system's flexibility, the user could readily construct a security system which would automatically turn itself on after 10:30 p.m. and turn off after 7:00 a.m. The system would incorporate all of the typical convenience features, such as exit delays (to allow time to get out of the house before the alarm system activates) and entrance delays (to allow time to enter the house to disarm the security system). The system would further allow the user to set up specific conditions for an alarm, e.g., if a window sensor is activated (i.e. the window is opened or broken), the system would wait until another sensor is activated (such as an inside motion sensor) before the alarm is triggered. This will avoid a potential false alarm which would occur, for instance, when a bird hits the window, or when thunder shakes the window. Thus, logic conditionals allow the system to require the activation of any number of sensors in any desired sequence in order to ring the alarm.

Moreover, all events which occur within the system will automatically be stored on disk. The system will actually track a burglar through the house, and store his movement through the house on disk. The system would turn on the lights, sound the alarm, call the police, even signal the user's beeper. However, it can also be monitoring the furnace, watering the lawn, and checking the basement for moisture all at the same time. Furthermore, the system can perform these multiple tasks while the user is working with his favorite spreadsheet program, or even while he is sleeping.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description, when taken in conjunction with the accompanying drawings, in which:

FIGS. 3A, 3B, 3C, 3D, 3E, 3F, 3G, 3H, 3I, 3J, 3K, 3L are pictorial representations of screen displays presented on the personal computer display monitor for user interface, typically in a windowing environment having pull-down menus accessible with a mouse;

FIGS. 6A, 6B, 6C, 6D, 6E, 6F are software program flowcharts illustrating the specific sequence of operations performed by the CPU of the personal computer in generating the screen displays of FIGS. 3A–3K in accordance with the practice of the preferred embodiment of the present invention.

DETAILED DESCRIPTION OF THE INVENTION

Figure 1:
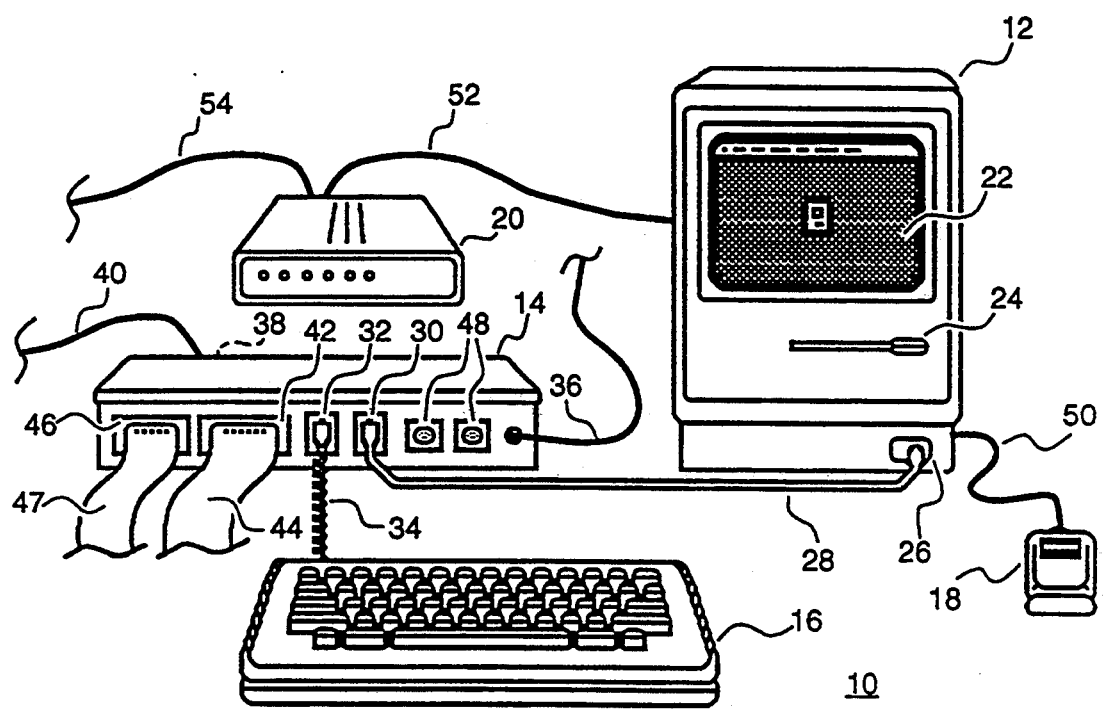
FIG. 1 is a pictorial representation of the main components included within a preferred embodiment of the peripheral data acquisition, monitor, and adaptive control system of the present invention.

Referring now to FIG. 1, there is shown a pictorial representation of the main components of a preferred embodiment of the peripheral data acquisition, monitor, and adaptive control system 10 in accordance with the present invention. The main system components include a personal computer 12, an I/O Bridge device 14, and a keyboard 16. The PC 12 may also include a mouse device 18 and a modem 20 if desired. The rear panel of the I/O Bridge device 14 is shown here for purposes of illustrating the interconnections.

In the preferred embodiment of the system 10, the host PC 12 is one of the family of MACINTOSH brand computers, i.e., the MACINTOSH PLUS, MACINTOSH SE, MACINTOSH II, MACINTOSH Portable, etc., available from Apple Computer, Inc., Cupertino, Calif. The MACINTOSH computer was chosen in the preferred embodiment because it presents an easy-to-use graphical interface to the user. However, other personal computers, even DOS-based machines, can be programmed to provide the features of the present invention. The PC shown in FIG. 1 is a MACINTOSH PLUS computer having a display screen 22 with a cursor indicator controlled by a mouse 18, and a floppy disk drive 24 adapted for 3-½ inch floppy disks. The PC 12 also has a keyboard port 26, which is normally adapted to connect directly to the keyboard 16. However, in this embodiment of the present invention, the keyboard 16 is coupled to the PC 12 through the I/O Bridge device 14. This is accomplished using an extension cable 28 connected between the keyboard port 26 and a first port 30 of the I/O Bridge 14, while a second port 32 of the I/O Bridge is connected to the cable 34 from the keyboard 16.

The I/O Bridge device 14 provides the interface between the PC, the keyboard, and any external electronically-controlled devices which are being monitored and controlled. The I/O Bridge 14 is powered via a 9 volt DC, 500 milliamp power supply (not shown) connected to the rear panel of the I/O Bridge via power cable 36. The front panel of the I/O Bridge 14 also includes an analog input port 38, which is connected via a coaxial cable 40 to a peripheral electronically-controlled device which would provide an analog input signal. An analog output port is also available on the front panel of the I/O Bridge 14.

A digital interface connector 42, also located on the rear panel, provides the user with 8 digital input channels and 8 digital output channels via a cable 44, which would be connected to other electronically-controlled devices being monitored and controlled using digital signals. An analog interface connector 46 provides the user with 8 analog input channels via cable 47 if desired. Two bus connector ports 48 are also available on the rear panel to allow the user to interface directly to the APPLE DESKTOP BUS (a trademark of Apple Computer, Inc.) on MACINTOSH SE, MACINTOSH II, MACINTOSH Portables, and newer MACINTOSH models. A compete description of the I/O Bridge device 14 is set forth in U.S. Pat. No. 5,099,444, issued on Mar. 24, 1992, entitled "Peripheral Data Acquisition, Transmission, and Control Device."

Continuing with FIG. 1, the PC 12 further includes a port for connecting to the mouse 18 via cable 50, as well as a serial port for connection to a modem 20 via cable 52 such that the PC can interface directly to the telephone lines 54. Of course, the modem may not be required in all applications.

Figure 2:
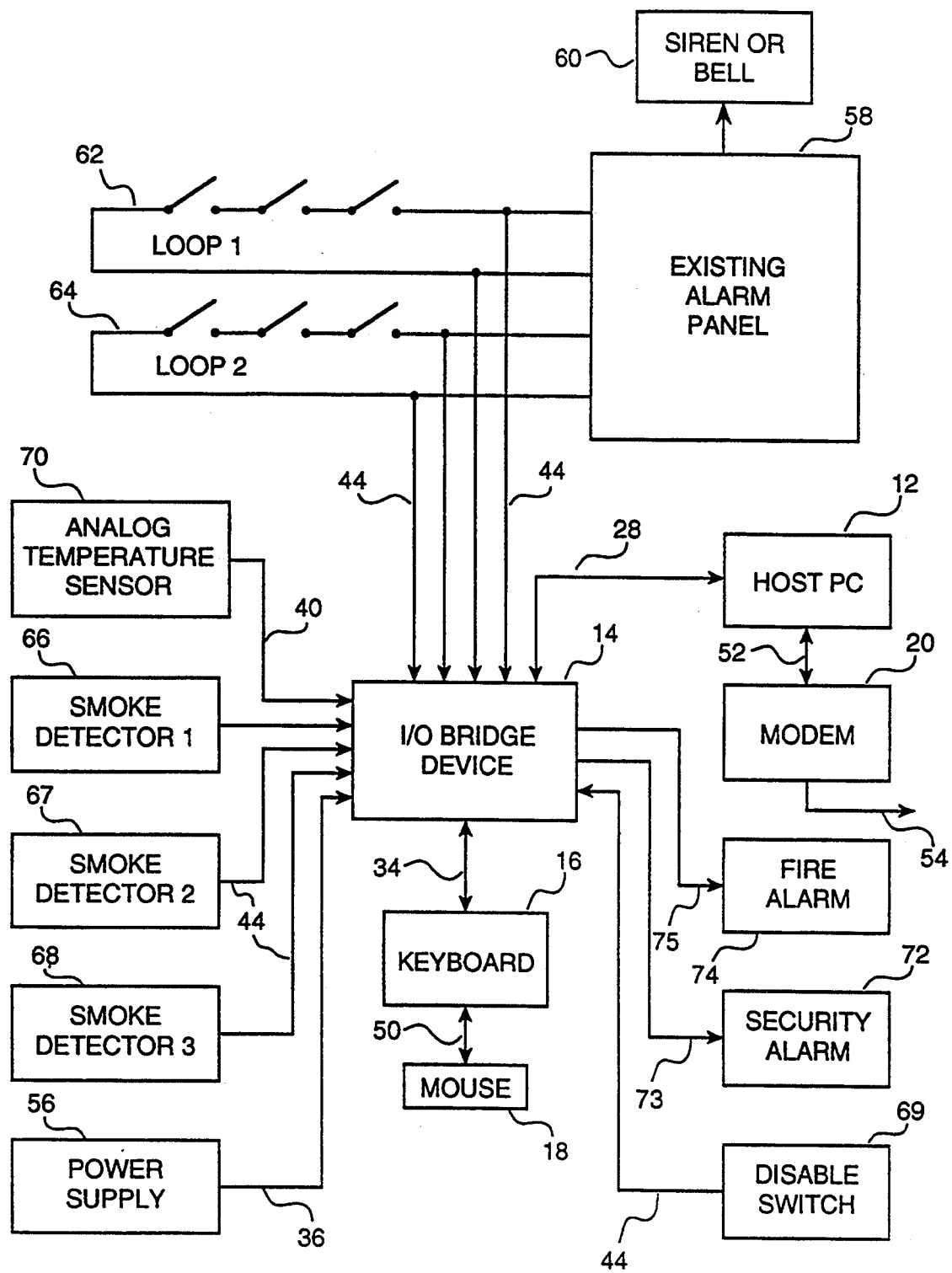
FIG. 2 is a general block diagram of a representative peripheral data acquisition, monitor, and adaptive control system used for a fire, and security alarm system in a building.

FIG. 2 is a general block diagram of a representative peripheral data acquisition, monitor, and adaptive control system used for a fire and security alarm system in a building. This figure sets forth a typical example of how the system of the present invention would be configured to an existing alarm panel. The host PC 12 is coupled to the I/O Bridge device 14, the keyboard 16, the mouse 18, and the modem 20, as shown in the previous figure. Note, however, that a separate power supply 56, is used to power the I/O Bridge device 14. Also note that the mouse 18 is shown connected to the keyboard 16 instead of the PC 12, which would be the case for the MACINTOSH II computer.

In the example of FIG. 2, the existing alarm panel 58 is configured to activate a siren or bell 60 whenever either one of the 2-wire loops 62 or 64 is broken. This would occur when any one of the sensor switches in either one of the loops is opened, due to a fire or a burglary, for example. The digital inputs to the I/O Bridge device 14 are connected via wires 44 to the loops as shown. Furthermore, the outputs of different smoke detectors 66, 67, and 68, each located at different positions within the building, are also connected to the same digital interface connector of the I/O Bridge via wires 44. A local disable switch 69 may also be connected to the I/O Bridge such that, for example, a security guard or fireman could turn off the alarm. If desired, an analog temperature sensor 70 could be connected to the analog input port of the I/O Bridge 14 via cable 40. The I/O Bridge outputs would then be used to control a security alarm 72 and/or a fire alarm 74, connected via wires 73 and 75, respectively, to the digital output ports. Using this configuration, the host PC 12 can monitor the inputs to the alarm panel 58, detect for smoke at different locations, measure the room temperature, and dial out over the telephone lines using the modem 20 to send information to a remote location. As will be seen below, the PC will also log all events to disk using a time-stamp format. The software program configuration for the system of FIG. 2 will be described below in conjunction with the screen display illustrated in FIG. 3A.

FIGS. 3A–3L are pictorial representations of screen displays presented on the PC display monitor for user interface. When using the MACINTOSH brand computers, the screen displays are presented in a windowing environment having pull-down menus accessible with a mouse. As known in the art, the cursor which appears on the screen is displayed as a pointer, and its movement is controlled by moving the mouse. The user can perform input selections by simply moving the pointer to the desired display box or icon and clicking the mouse in much the same manner as pushing a button. If a control or scroll bar is clicked and dragged, its position on the display screen will move in accordance with the relative position of the mouse.

Figure 3A:
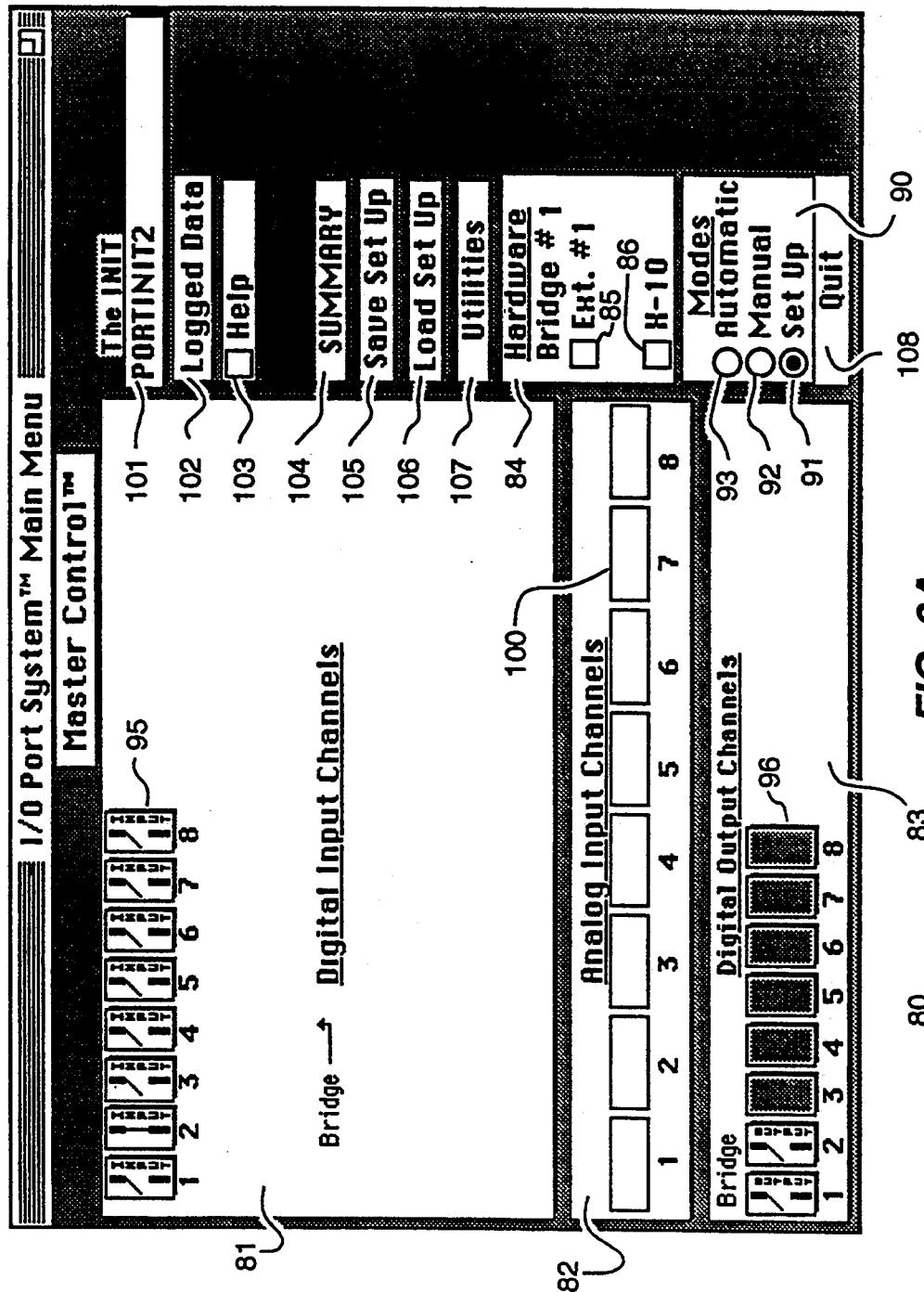

FIG. 3A is the main menu or MASTER CONTROL panel 80, which appears when the user first loads the program and opens the main menu stack. The MASTER CONTROL panel 80 illustrates the hardware configuration of the particular application. Three different types of input/output channels are used, and their individual icons are grouped by their types of channels. Digital inputs, located in display box 81, are used in applications where an electronic device digital sensor produces a monitoring signal which is either on or off, true or false, open or closed, etc. Analog inputs, located in display box 82, are used in applications where the analog sensors provide inputs having a specific reading within a range of values, typically measured in millivolts. Digital outputs, located in display box 83, are used to turn on or off any electrically-operated device.

The system of the preferred embodiment is capable of monitoring 8 digital inputs using one I/O Bridge device 14. Digital interface multiplexers, called "Extenders", can optionally be used to multiplex the 8 digital input channels of a single I/O Bridge device into 32 input channels. The digital Extender is described in U.S. Pat. No. 5,099,444, issued on Mar. 24, 1992, which is incorporated herein by reference. If one digital Extender has been added, the system can monitor up to 32 digital inputs. If 2 Extenders are connected to the I/O Bridge, 64 digital inputs can be monitored. Each I/O Bridge will also allow the system to monitor up to 8 analog input channels. Finally, a single I/O Bridge allows the user to control up to 8 digital output channels. If a digital Extender is connected, up to 8 digital output channels can still be controlled, but the channels will be controlled using relay outputs. If 2 Digital Extenders are connected to the Bridge, the user can control up to 16 digital outputs.

The system hardware configuration is initially set up using the display box 84 labeled "Hardware". One INIT should be loaded for each I/O Bridge connected to the system. A particular INIT can be selected by the MASTER CONTROL program in the Set Up Mode. If one digital Extender is added to I/O Bridge #1, then the user must configure the system as such by selecting Ext. #1 by clicking on the button 85 with the mouse. When this is done, the 8 digital inputs in display box 81 will disappear and 32 digital inputs will appear in their place. If two digital Extenders are selected, then a total of 64 digital inputs and 16 relay outputs will appear. If X-10 outputs (described below) are desired, the user would click on button 86.

As seen in the lower right portion of FIG. 3A, the MASTER CONTROL panel 80 includes a Mode select box 90 which offers the user a choice of 3 modes: Set Up Mode, Manual Mode, and Automatic Mode.

The Set Up Mode button 91 allows the user to configure the system to a particular application. In this mode, the user can enable or disable any input or output channel by using the mouse to point-and-click on the various channel icons. Each of the input and output channels is accessible by either clicking on the corresponding channel icon or by using the pull-down menus.

The Manual Mode button 92 is used to view and control the system as it is running. This gives a complete picture of the current status of all inputs and outputs for the selected I/O Bridge. As decisions are being made by the program, the computer will beep, and the user will see the icons for the relay or digital outputs change on the screen in real time.

The Manual Mode further allows the user to force a digital input or output channel to its opposite state, and allows the user to enter a specific analog input reading. The forced channels are processed by the background program INIT just as if they had been received by the I/O Bridge. This allows the user to test the chain of events which should occur when a particular input is sensed. Even this manual override simulation of the input sensor changing causes the series of beeps to occur, the appropriate window to pop up, and an output to be activated to the electronically-controlled device. Therefore, this feature of the Manual Mode is frequently used to test the setup and ensure that the newly-configured system meets particular specifications. Once the system has been tested, the user may exit the MASTER CONTROL program and the I/O Bridge will function in the background. After the system has been placed in operation, the Manual Mode is also very helpful in trouble-shooting.

The Automatic Mode, which is selected using button 93, is used to view the user setup as it is running. The Automatic Mode does not permit manual control of inputs or outputs. Instead, the MASTER CONTROL panel provides the user with a complete picture of all the signals which are being received at the I/O Bridge, the decisions being made, and the output relay or digital output icons changing.

More specifically, in the Set Up Mode, the digital input channels are first configured when the user selects a specific input channel by clicking on the selected digital input channel icon 95. The program will then take the user to the information window for that input, which will allow the user to specify the name of the sensor connected to the input channel, determine if it is normally open or closed, and set specific properties for a particular input. This information window will be described below as FIGS. 3C and 3D. Note that the user can also get information on the desired digital input channel by using the pull down menu.

The analog input channels are set up in similar manner, where one of the analog input channel icons 100 is selected and an information window (FIG. 3E) appears for that input. This window allows the user to specify the name of the sensor which will be connected to the input channel, determine the calibration slope and offset, etc.

Clicking on the desired digital output channel icon 96 in the Set Up Mode will take the user to the information window (FIG. 3H) for that output. This will allow the user to specify the name of the device which will be connected to the output channel, to determine if it is normally open or closed, and will to set the specific properties of that digital output channel. Note that the input and output icons are completely shaded and the text is removed when disabled, as illustrated for digital output icons #3–#8.

In the Manual Mode, the program will allow the user to manually force a digital input open or closed by clicking on the desired input channel icon 95. This feature is very useful for system testing, since it allows the computer to respond to the forced input channel as if it had actually come from the I/O Bridge. Therefore, to test the entire system configuration, one does not have to physically open and close every input channel at the I/O Bridge devices.

The analog input channel icons 100 operate in a similar manner, but allow the user to manually force an analog input to a specific reading by selecting the desired input channel and entering an analog value in response to the prompt. This feature is also very useful for system testing, because it allows the computer to respond to the manually-entered value without having to connect a proper voltage source to the analog input channel at the I/O Bridge.

The output channels also permit the user to manually force a digital output open or closed by clicking on the desired output channel icon 96. Therefore, to test each individual output from the I/O Bridge, the user can bypass the entire input and condition statement scheme previously set up and directly test each output channel individually.

In the Automatic Mode, the program will automatically update the digital input channel icons 95 by communicating with the INIT driver program which runs in the background and constantly interacts with the I/O Bridge. Constant updating of the screen 80 will show the functional status of each electronically-controlled device connected to the I/O Bridge. When any digital channel has changed to its opposite state, i.e., a normally closed channel is opened and vice-versa, that channel icon will be highlighted or colored to show the user that the input is in the opposite state. The analog channel icons 100 will display the analog reading, as corrected by the slope and offset. Furthermore, when the analog channel is in its true state, i.e., within or outside of a specified range, the icon 100 will be highlighted or colored on the display. However, in the automatic mode, selecting and clicking on any channel icon will have no effect.

Again referring to the screen display of FIG. 3A, the INIT field 101 shows the name of the INIT driver program which the MASTER CONTROL program is referring to. Typically, one INIT is used to control one I/O Bridge device. However, multiple INITs can run simultaneously in the background to control more than one I/O Bridge. Clicking on field 101 will allow the user to choose which INIT the display screen is referring to. The INITs may be duplicated, renamed, have different I/O Bridge addresses, and different set up files linked to each INIT. The user must reboot before the computer will recognize the INITs. The INITs which the user would like the system to recognize must be in the user's system folder.

The Logged Data button 102 automatically opens the MASTER CONTROL Desk Accessory to display the last 200 events which were logged from the INIT, as will be seen in FIG. 3L. The Help button 103 provides help commands for most functions of the MASTER CONTROL program. The Summary button 104 is used to get an overall picture (FIG. 3J) of the I/O channels for the particular system setup. The Summary window will display the names of the input channels which are being used, and will give the user a detailed description of the I/O channels. The user can also save the system configuration information to a disk text file or load a previous set up text file with the Save Set Up button 105, and the Load Set Up button 106. The Utilities button 107 allows the user to do several disk oriented functions, such as compact the stacks, analyze a data file, change the address of the I/O Bridges, add additional I/O Bridges, etc. Finally, the Quit button 108 is used to exit the MASTER CONTROL program.

Figure 3B:
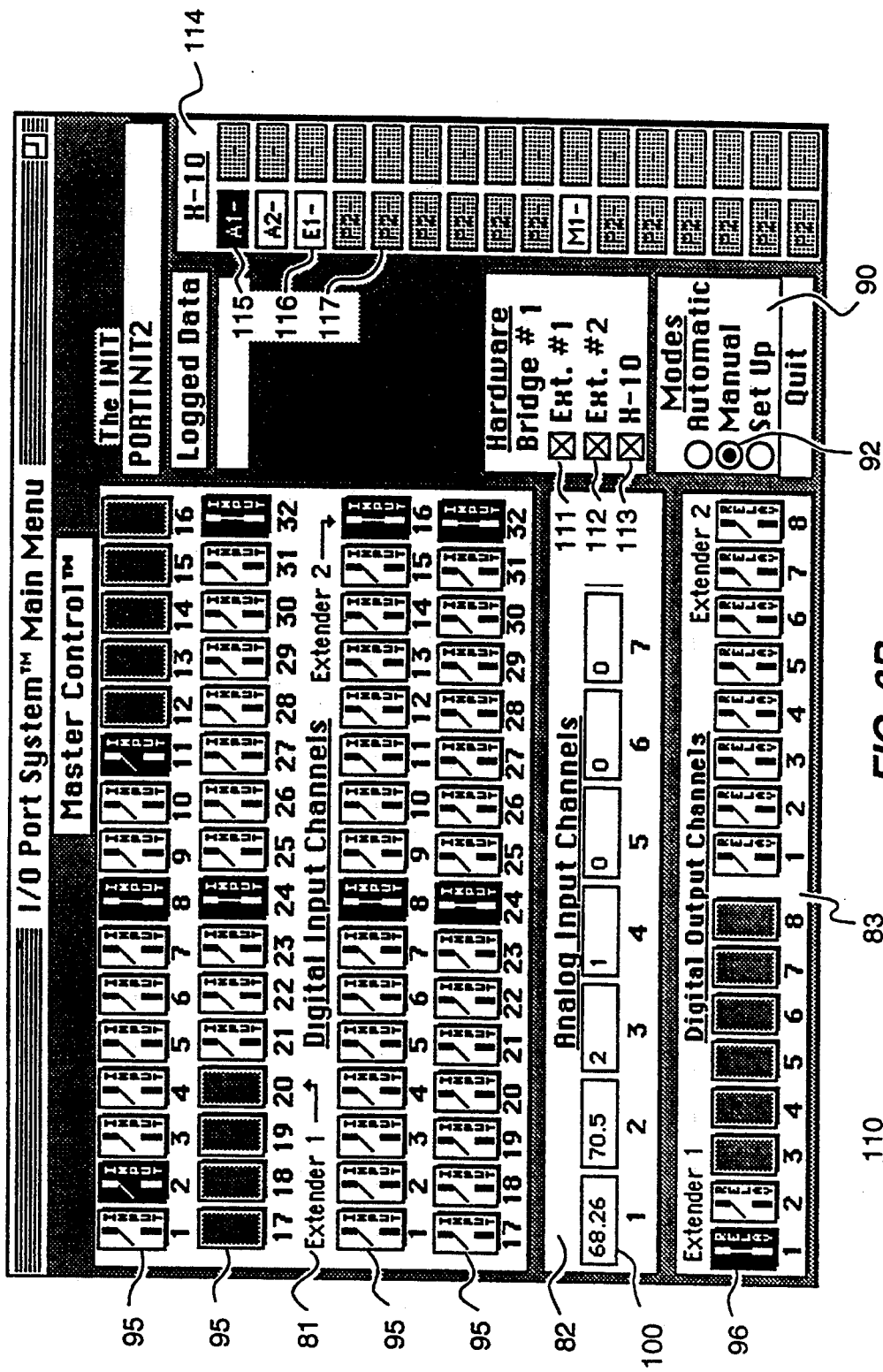

FIG. 3B illustrates a display screen 110 configured for an alternate embodiment of the present invention having a much more complex system configuration. Note that the Hardware display box 84 indicates that a first Extender 111 and a second Extender 112 is configured to multiplex the input channels, and that a third indicator button 113 shows that X-10 outputs have been configured into the system. As is known in the art, "X-10" is the standard code format for power-line carrier transmission, such as used in lamp and appliance control modules manufactured by X-10 (U.S.A.) Inc., and sold by Sears, Roebuck and Company, Radio Shack, and others. Once the X-10 indicator button 113 has been activated, then the X-10 display box 114 becomes active to present an icon for each X-10 output. Each X-10 module is represented by an icon having its configuration code displayed thereon. Note that the X-10 icon 115 has been colored or reverse-video shaded to indicate that it has changed from its normal state, X-10 icon 116 is shown in its normal state, and X-10 icon 117 is shaded to indicate that it is disabled, i.e., inactive and not connected to the system.

Instead of having 8 digital input channels shown in display box 81, the alternative system configuration of FIG. 3B utilizes two Extenders to multiplex the eight digital input channels of a single I/O Bridge device into 64 input channels 95. Since this display screen is shown in the Manual Mode, the real-time functional status of each channel is indicated to the user. Accordingly, the display screen icon for digital input channel #2 of Extender #1 appears in reverse video to indicate that it has changed from its normal state. As shown in the previous figure, any disabled icons, such as digital input channel #12 of Extender #1, are shaded to indicate that they are inactive.

Eight analog input channels 100 have been shown in display box 82, and their calibrated analog values appear in each of the 8 input channel boxes. For example, analog input channel #2 would correspond to 70.5 degrees Fahrenheit if the temperature sensor for that analog input channel has been calibrated to read in degrees Fahrenheit, as will be explained below.

Sixteen digital output channels 96 are provided by two digital Extenders, as shown in display box 83. Again, note that the icon for digital output channel #1 of Extender #1 is colored to indicate that the relay is presently not in its normal state.

Figure 3C:
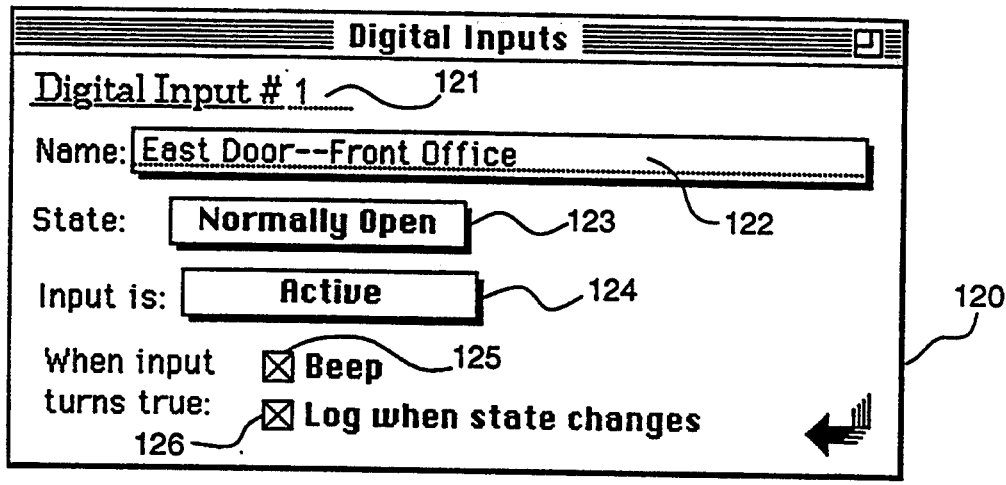
Figure 3D:
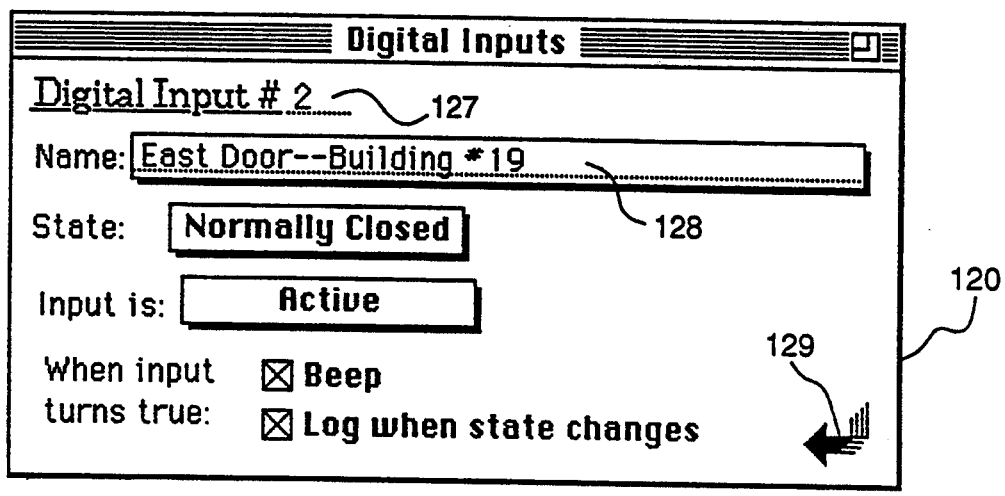

FIGS. 3C and 3D illustrate screen display windows 120 that pop up whenever a digital input icon 95 is selected by the user. The Digital Input window 120 provides the user with the ability to individually name and keep track of the names, functions, and active/inactive status of each of the digital input sensors being used. The first field 121 is the program's (reference) name for that digital input channel. The next field 122 allows the user to enter a user's name for Digital Input #1, e.g., "East Door—Front Office" for a door sensor of a security system. The State button 123 is used to indicate whether a normally open or normally closed switch state is desired. If the particular input channel is not going to be used, the user may click the button 124 and disable the input, wherein the word "Inactive" will appear in the button 124. This will tell the I/O Bridge to ignore the input. If the user would like the computer to beep when the input changes, button 125 is selected. If the user would like to keep a running log of events each time this digital input turns true, then button 126 is selected such that the INIT will update a record of events file upon each occurrence of a change in state.

FIG. 3D illustrates another Digital Input window 120 for digital input #2. In this case, however, digital input channel #2 is connected to the East Door of Building #19, and the name field 128 has appropriately been changed. In this way, the record of events will present the user with information as to the input channel's location and/or functional status. The arrow 129 at the lower right of the window allows the user to return to the main menu.

Figure 3E:
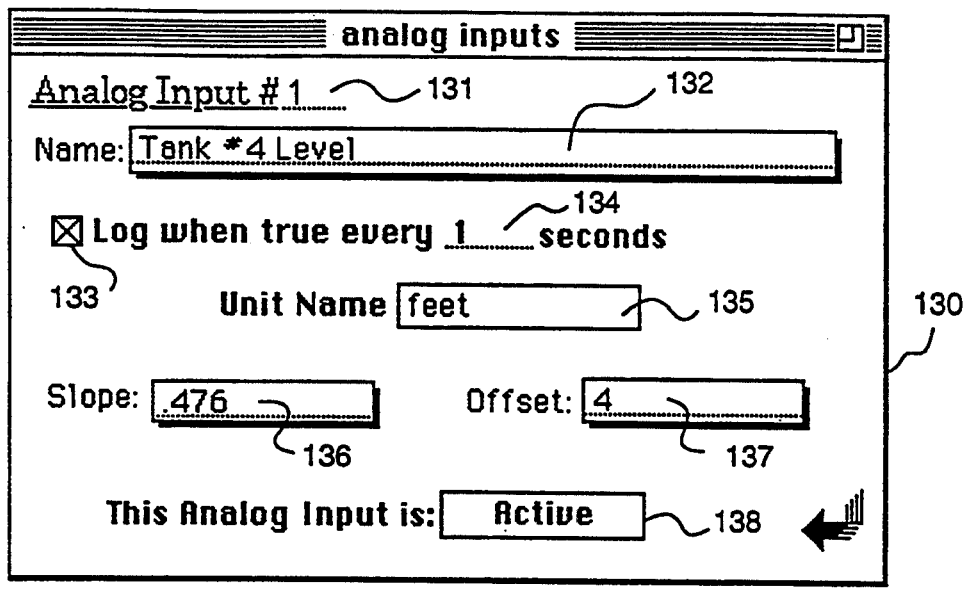

Turning now to FIG. 3E, an analog input window 130 is shown. This window appears whenever the user selects a particular analog input channel 100 to get specific information about that channel. Once again the user can give the input a name using field 132 to help the user configure the system. Another button 133, labeled "Log When True", allows the user to set the time interval at 134 between logged values, and is activated whenever the user would like to monitor specific values over a period of time. If button 133 is activated, the analog input window instructs the program to beep and store the event when it turns true. Field 135, labeled "Unit Name", allows the user to choose the measurement units which will be logged after each value. Thus, if the user is logging temperature, field 135 may be used to instruct the measurement reading to be logged as 10.0° C. (degrees Celsius) instead of 10.0.

The user may also give each analog input a slope 136 and offset 137. By specifying a slope and offset, the analog reading will be scaled and will appear as a calibrated value. Slope and offset are derived from the formula:

$$Y = mX + b$$

where m is the slope and b is the offset. This formula is used to convert readings from a working scale of 0–250, which corresponds to an actual analog input range of 0–5 Volts DC, into readings which take into account the type of sensors used. In other words, scaling the analog input values allows the system to display and log the analog values in terms that are meaningful to the user, i.e., degrees Fahrenheit, pH, molarity, percent volume, DC millivolts, etc.

To calculate the slope and offset for a particular analog input sensor, the user will need two calibration data points. For the example of a wide-range temperature sensor, a first measurement reading should be obtained when the sensor is submerged in boiling water (approximately 212° F. or 100° C.), and a second reading obtained when the sensor is in an ice bath (approximately 32° F. or 0° C.). When obtaining these readings, the slope field 136 for the analog input channel is initially set to 1, and the offset field 137 is set to 0. Now the user can convert the calibration readings so that the MASTER CONTROL program will present them in degrees Fahrenheit or Celsius. The following formula is used to derive the slope:

$$m = \frac{(Y_2 - Y_1)}{(X_2 - X_1)}$$

For example, say that a user places the temperature probe into a boiling pot of water and obtains a raw analog input value reading of 190. Next the sensor is placed in an ice bath and a reading of 60 is obtained. Using 100° C. and 0° C. as $Y_2$ and $Y_1$, respectively, entering these values into the formula provides:

$$m = \frac{(100° C. - 0° C.)}{(190 - 60)} = \frac{100}{130} = 0.769$$

Therefore the slope m is 0.769. Now the offset b can be calculated by applying one of the raw analog readings and the calculated slope to the formula:

$$b = Y - mX$$

or in this example:

$$b = 100 - (0.769 \times 190) = 100 - 146.11 = -46.11$$

Therefore the offset b is −46.11. If the user enters these values into the slope and offset fields 136 and 137 of the analog input window 130, the readings from the temperature sensor will be returned as degrees Celsius.

If the user would like to incorporate analog input channels into the list of conditional statements which must be satisfied before an output will be activated, the user must specify the analog conditions. This is accomplished by choosing the Analog Conditional pull-down menu from the Main Menu.

Figure 3F:
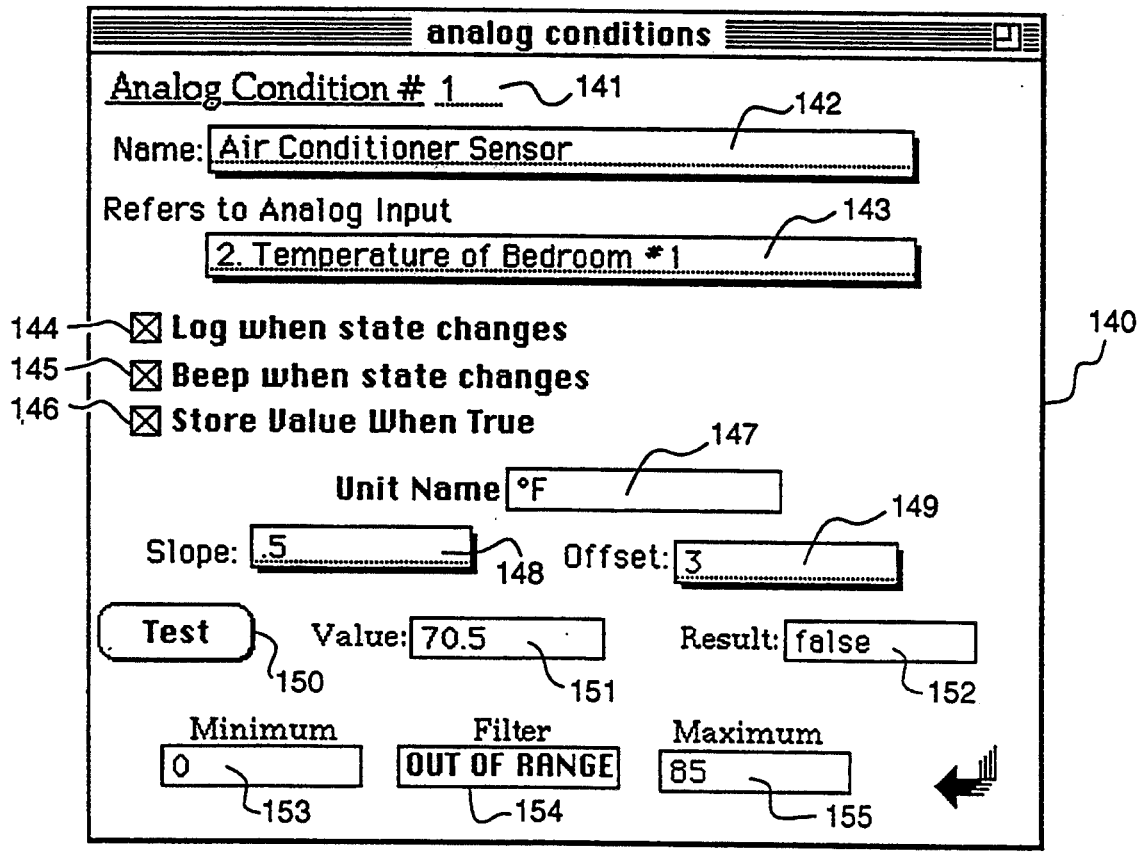

FIG. 3F illustrates the analog condition window 140. This window will allow the user to specify a name for the analog condition, and will allow the user to set up various parameters by which the program will test the analog input. A name field 142 identifies the condition, and an analog input field 143 specifies which analog input the analog condition will be referring to. Buttons 144 and 145 are used to log and indicate changes of the resultant state of the conditional. Button 146 is used to store the analog value on disk when the condition is true. The Unit Name field 147, the Slope field 148, and the Offset field 149 will automatically be copied from the appropriate Analog Input channel window 130. If these fields remain blank after the user selects the analog input from the pull-down menu, then the user should go back to the main menu and specify this information on the analog input channel window 130.

Next, the user will be able to specify minimum and maximum values which will be used to build the analog condition. Once the minimum value 153 and the maximum value 155 have been chosen, the user will need to choose a filter by clicking on the button 154 below the word Filter. This will give the user three choices: In Range, Out of Range, and No Filter (or None). Choosing the In Range filter means that if the scaled reading from the analog input channel falls between the specified minimum and maximum values, then the analog condition will be true. On the other hand, if the user has specified the Out of Range filter, then the analog condition will be true when the scaled reading from the specified analog input falls outside of the minimum and maximum values. Choosing No Filter signifies that the analog condition will never be met.

Once the user has finished building the analog condition, the Test button 150 can be used to take a raw reading from the selected analog input channel, scale the reading using the slope and offset values, put the scaled value in the Value field 151, compare it to the maximum and minimum values, test its value against the selected filter, and put a true or false into the Result field 152. In this way, the analog condition can readily be tested without physically changing the analog input sensor.

Figure 3G:
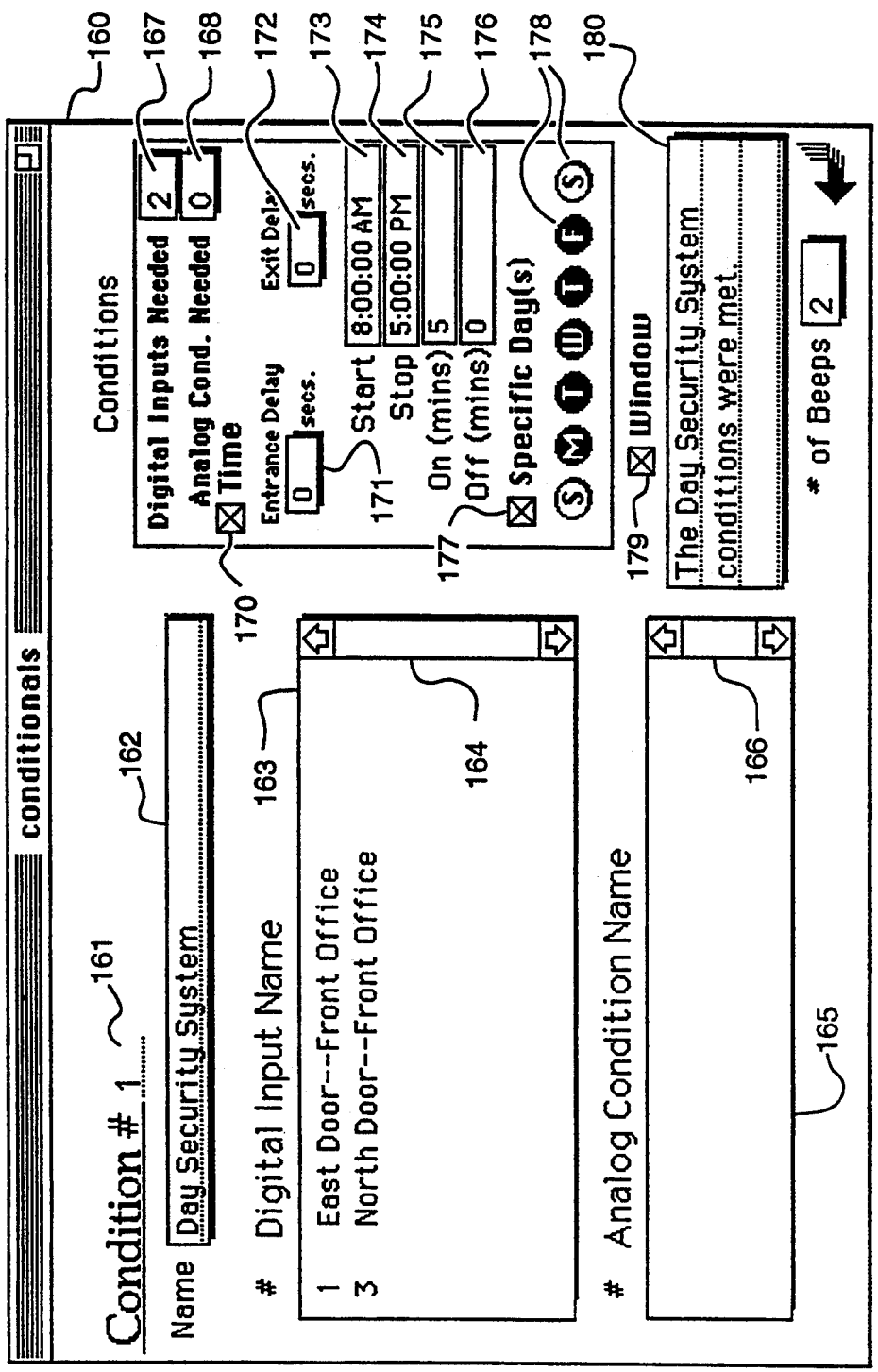

FIG. 3G is the display screen for the conditionals window 160. As mentioned above, conditionals are logic statements executed by the computer to determine whether or not an output should change. Pulling down the conditionals menu from the Main Menu bar will bring up the screen shown in FIG. 3G.

Once again, the user can enter a name in field 162 for the condition which the user will be using. Next, the user can choose the digital input channels from the pull-down menu which are to be monitored for this particular condition. This is accomplished by selecting a particular digital input from the pull-down menu. Digital inputs which have been selected in this manner will appear in display box 163. If more inputs are selected than can be shown in the display box 163, then the scroll bar 164 can be used to scroll through the list. The user can then decide how many of the digital inputs which have just been specified are required to make the condition true. This number is entered into field 167 labeled "Digital Inputs Needed". For example, the user may have 6 digital inputs in a security system, but the user may only want to have any one of the six be activated in order to meet the requirements for the condition. To give the system a higher level of redundancy, the user may wish to specify two of the six so that at least two sensors must be activated in order to ring a burglar alarm.

If analog channels are used, the user will have to specify the analog conditions in window 140 before linking them to a conditional in window 160. Once built, the analog conditions can be linked to the conditional by selecting the desired analog condition from the pull-down menu available for this screen. Just as with digital inputs, the user may specify the number of analog conditions required, and enter that number in field 168 labeled "Analog Cond. (Condition) Needed".

If the user would like the conditional to be active during a specific time period, the user can select the Time button 170. This will allow the user to enter the time of day, as well as specific days of the week during which the condition will be true, assuming all of the other parameters were met. More specifically, the Entrance Delay field 171, used in security systems, allows the security guard to deactivate the alarm within a specific time interval after entering a building. Similarly, the Exit Delay field 172 allows for a specified time to get out of the building before the alarm is activated.

The Start time field 173 specifies the time of day to start controlling the digital output channel and/or X-10 output. The Stop time field 174 specifies the time of day to stop controlling the digital output channel. If the user specifies an On time in field 175 and an Off time in field 176, the output will turn on for the on time duration, and off for the off time duration. It will continue to cycle in this manner from the Start time until the Stop time is reached. For example, if the user is controlling a lawn sprinkling system in order to avoid watering bans, the user can set a start time to 12:30 a.m. and set the Stop time to 7:30 a.m. to let the sprinkling system water only during the night. The user can also give the On time a value of 5 minutes and the Off time a value of 12 minutes, to enable the repetitive cycling feature. Thus, at 12:30 a.m. the sprinkling system will turn on for 5 minutes, then off for 12 minutes, then on for 5 minutes, then off for 12 minutes, etc., until 7:30 a.m., when it will turn the sprinkling system off. If the Specific Day button 177 was selected, the output will be activated only on the days specified using the day buttons 178. This is common in sprinkler system applications, when the user might want to water the lawn only on Monday, Wednesday, and Friday. If the alert button 179 is selected, then the alert message can be entered in field 180.

Figure 3H:
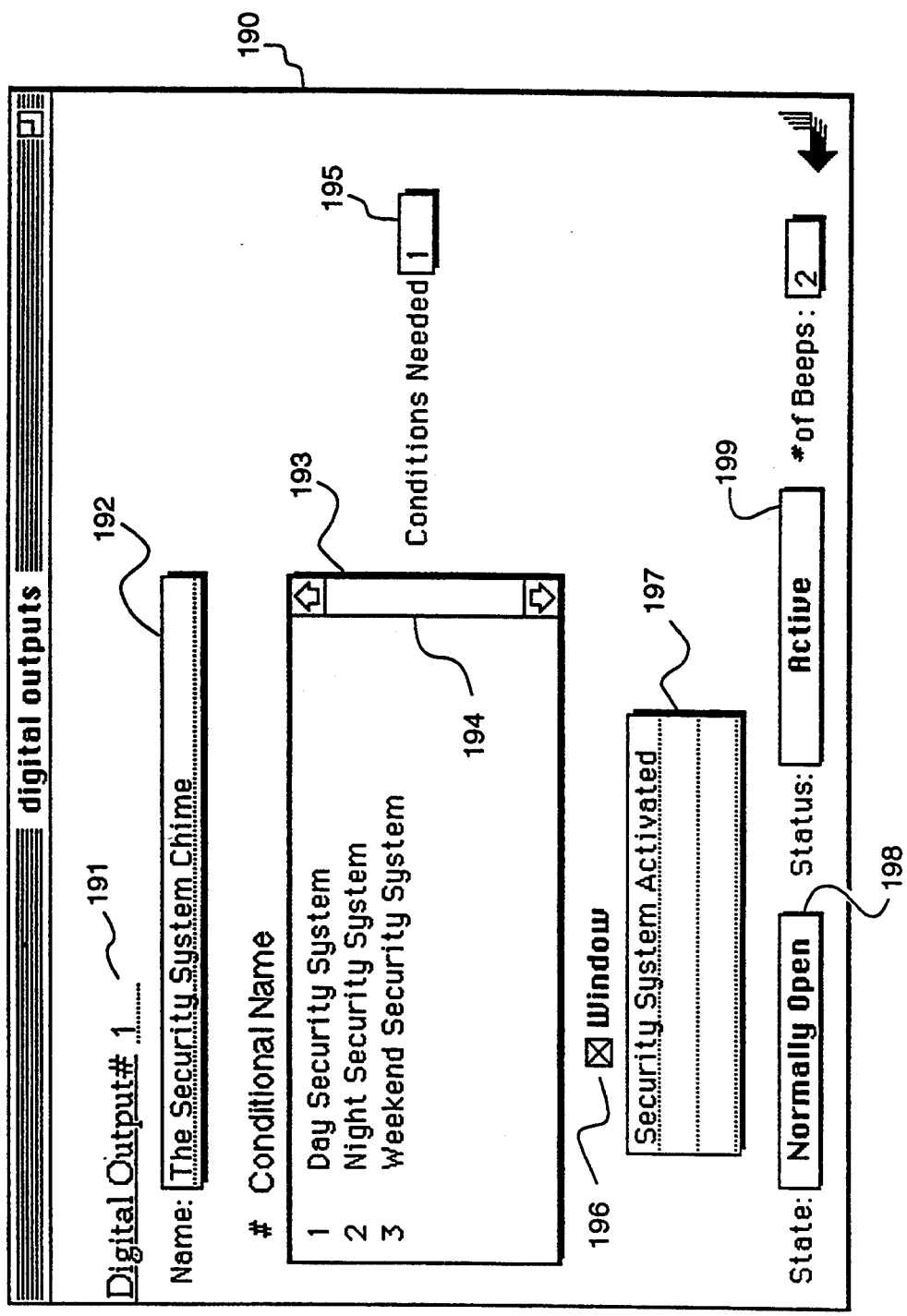
Figure 31:
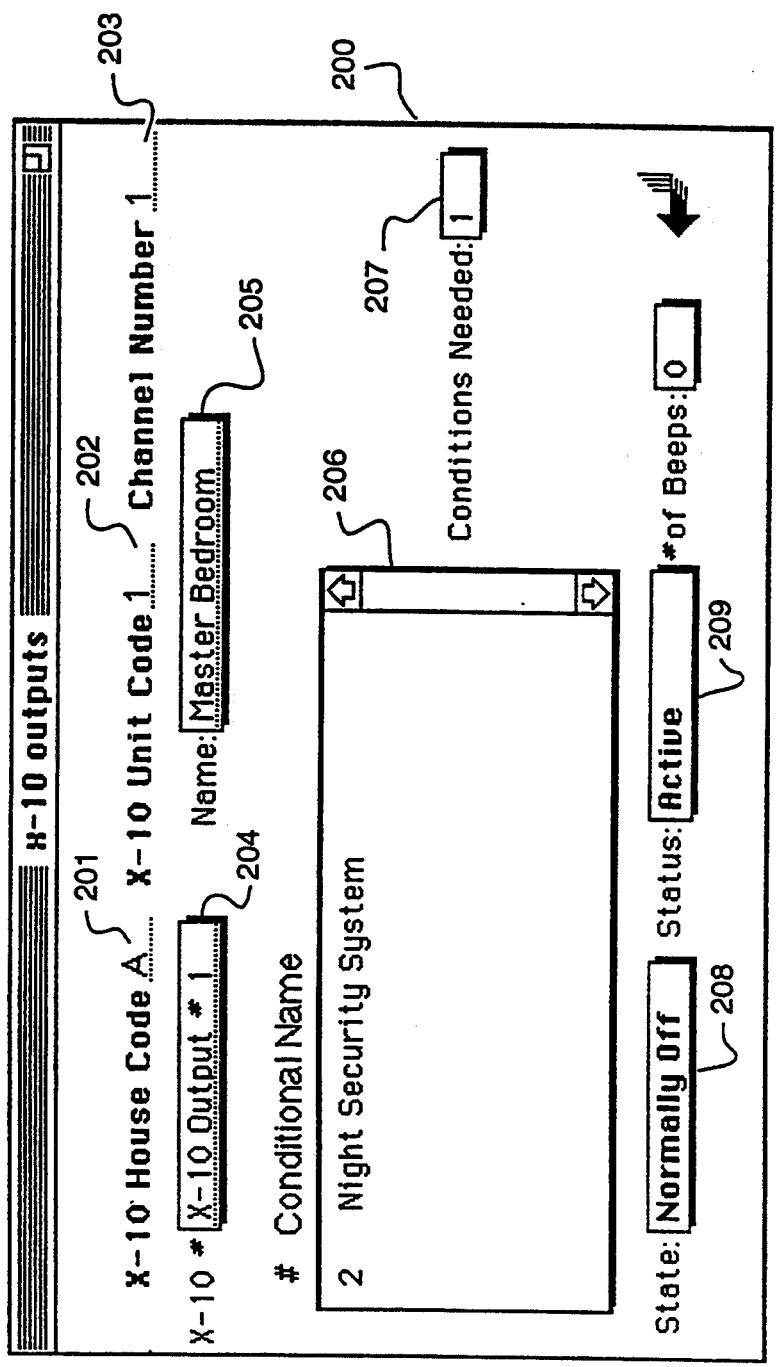

The display screen of FIG. 3H is used to set the digital output parameters. The digital output window 190 again allows the user to name the specified output channel field 192, and choose the conditionals which will be required to make the output channel true. The conditionals appearing in the display box 193 are entered and removed utilizing a corresponding pull-down menu by selecting or deselecting the conditional which will be required. The conditionals in the list 193 can be scrolled using control 194. Once the user has specified the conditionals, field 195, labeled "Conditions Needed", is used to further specify the logic decisions. The number which the user enters in field 195 is the number of conditionals (within the specified list) which must be true in order for the digital output to turn true. For example, if field 195 contained the number 2 and if three conditionals were listed in display box 193, then if any two conditionals from the list of three conditionals turn true, the digital output will be true. This method of determining conditionals permits the MASTER CONTROL program to accommodate very sophisticated boolean logic expressions in a manner that is very user-friendly and particularly easy to understand.

When the Window button 196 is selected, the MASTER CONTROL program instructs the background INIT program to interrupt the application program which is being run in the foreground whenever the state of the digital output changes. Upon this interrupt, an Alert window is displayed having the text message which is entered by the user in field 197. The Alert window also identifies the particular INIT that created the message, the I/O Bridge number, the channel number, etc. Hence, the Alert window operates to display the functional status of the I/O channels in real time, even during the Automatic Mode and Manual Mode of the MASTER CONTROL program. However, in the preferred embodiment, the INIT does not show this functional status during the Set Up mode.

The State button 198 is used to determine whether the normal state of the digital output is to be normally open (n.o.) or normally closed (n.c.). The Status button 199 determines whether the digital output is active or inactive.

The X-10 output window 200 shown in FIG. 3I operates in much the same manner as the digital output display screen 190 of FIG. 3H, described above. The X-10 house code and unit code are entered into fields 201 and 202, respectively, and the X-10 channel number in field 203. The MASTER CONTROL program automatically enters the X-10 reference name in field 204, but the user can choose a functional name for the X-10 output channel in field 205.

The list of conditionals appears in display box 206, and can be edited by pulling down the corresponding menu and selecting one or more of the conditionals which will be required. Again, the Conditions Needed field 207 sets the number of listed conditionals which must be satisfied before the X-10 output will go true. The State button 208 and Status button 209 operate in the same manner as previously described.

Figure 3J:
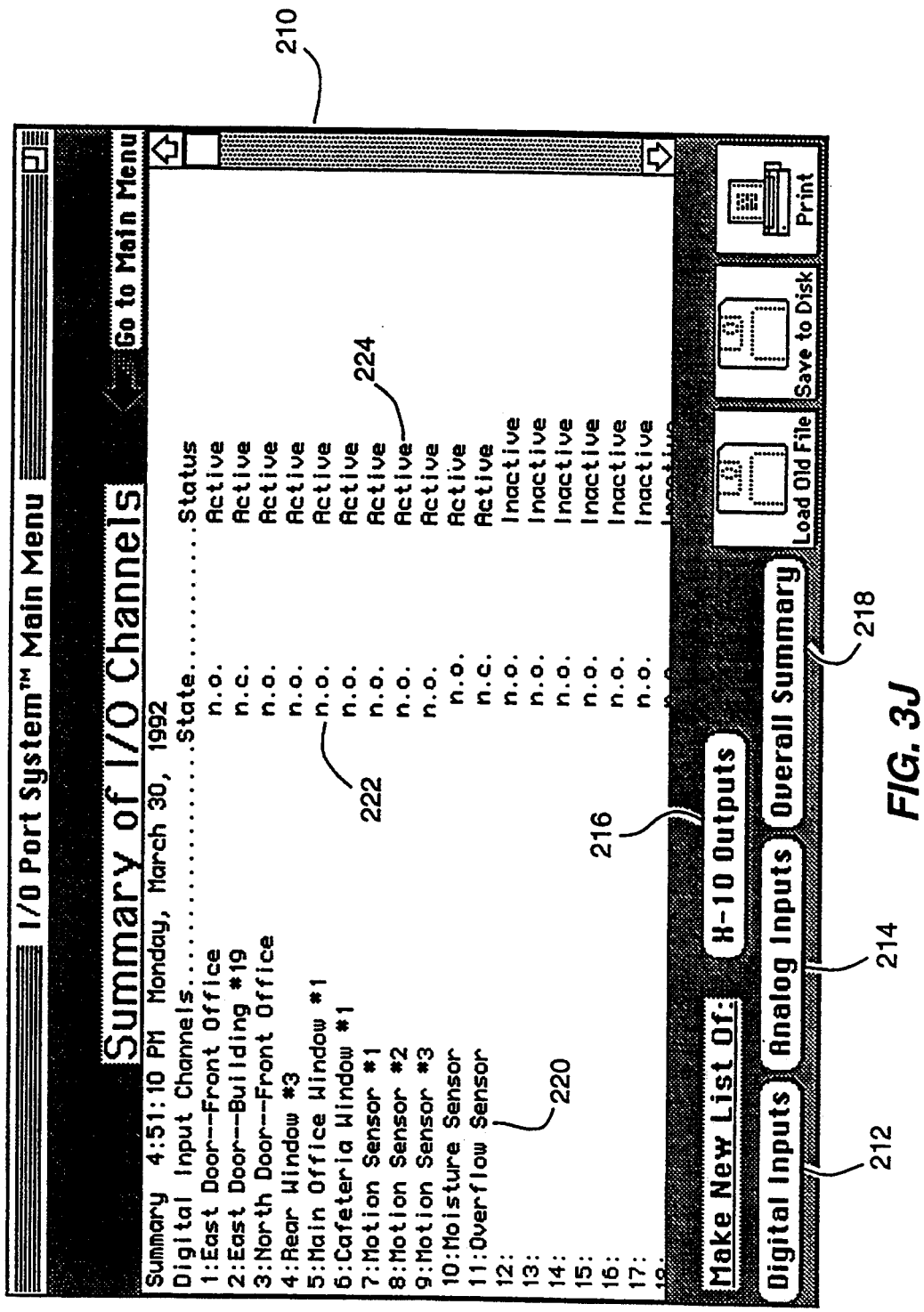

FIG. 3J illustrates the Summary of I/O Channels display screen 210 which is presented whenever the user clicks on the Summary button of the main menu. The Summary is basically a database-type report of either a particular kind of channel, or an overall summary of all the channels. For example, the display screen 210 shown in this figure would appear if the user selects the Digital Inputs button 212. A new summary list of only analog inputs would appear if button 214 was selected, or a list of X-10 outputs would appear if button 216 was selected. A list of only digital outputs could also be generated if desired. An overall summary of all inputs and outputs is displayed if button 218 was selected. The Summary of digital inputs shown on display screen 210 sets forth all the digital input channels as they were set up under the user-defined names listed in column 220, the corresponding state of the input (normally open or closed) listed in column 222, and the active/inactive status listed in column 224.

Figure 3K:
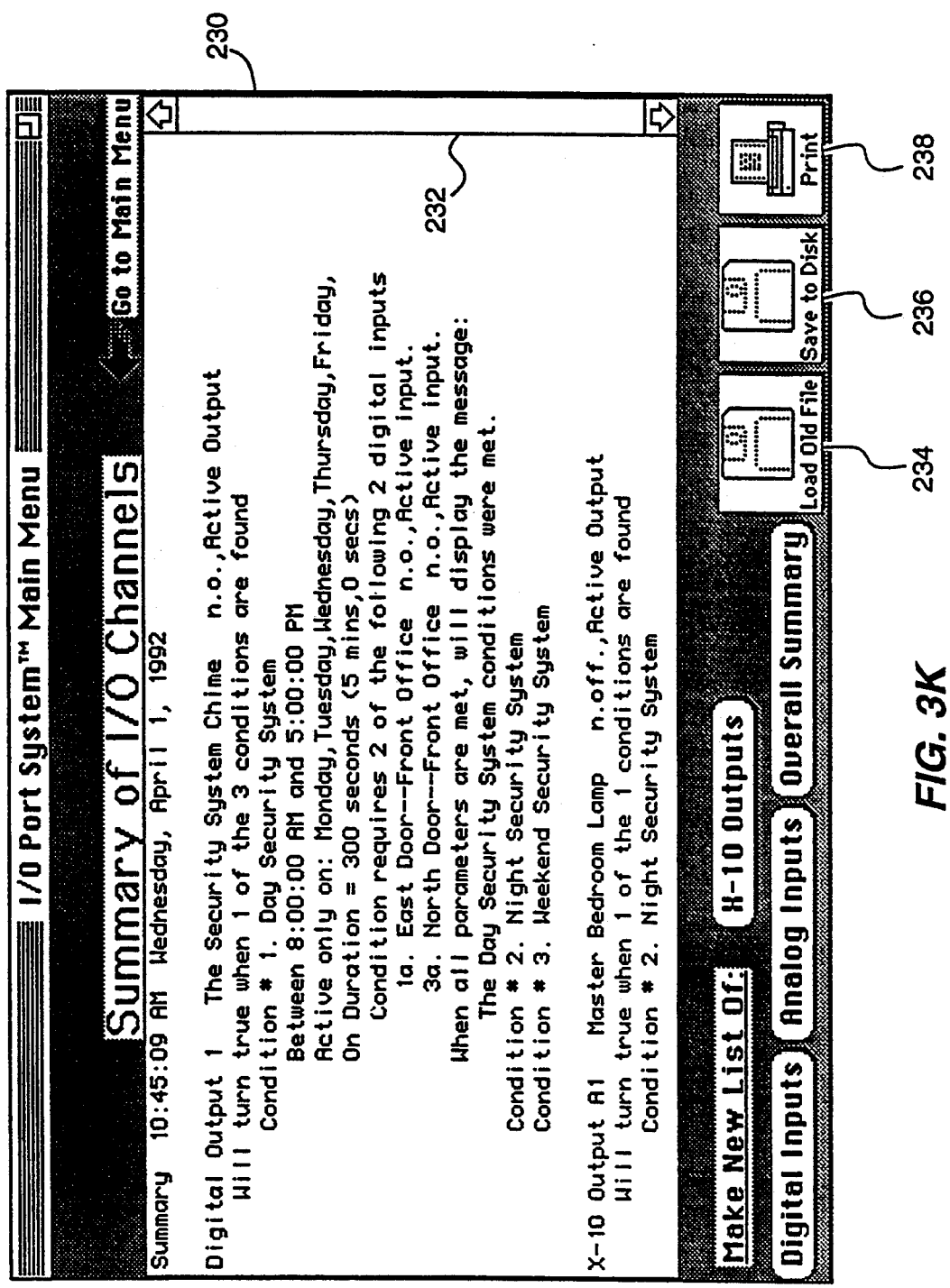

FIG. 3K presents the Overall Summary of all inputs and outputs in display screen 230 which appears when button 218 of display screen 210 is selected. The Overall Summary sets forth the output channels by listing all the parameters and various conditions needed to activate the output in a format which is readily understandable by the user. These parameters include the digital inputs required, the time of day, entrance delays, exit delays, days of the week, the analog channels required, the maximum and minimum readings from the analog channels, etc. This feature allows the user to obtain an overall perspective of how the computer will process the information obtained from the I/O Bridges. The Overall Summary is very useful for documenting and troubleshooting the user's particular application. The user can return to the list of only the digital or analog input channels by clicking on the appropriate buttons at the bottom of the screen. If the user would like to retrieve a previously-stored summary text file, the Load Old File icon 234 would be selected. If the current Summary is to be save to disk as a text file, then the Save to Disk icon 236 would be chosen. Finally, if a printed report of the Summary is desired, the user would click on the Print icon 238.

FIG. 3L illustrates the logged data Results display screen 240, which represents the record of events which can be displayed on the screen using the MASTER CONTROL program Desk Accessory and/or can be logged to disk as a plain-text ASCII file. The Desk Accessory will also allow the user to control any of the currently-installed MASTER CONTROL program INITs. The user can also create a password for the MASTER CONTROL INIT using a password feature found in the pull-down menu in the Desk Accessory.

The Results screen 240 lists the last 200 transactions which were logged by the INIT. The date that the item was logged is shown in column 242, and the exact time is shown in column 244 using a time-stamp including hours, minutes, and seconds. The I/O Bridge number appears in column 246, the channel's reference name in column 248, and the channel's user-defined name in column 250. The analog or digital result is shown in column 252, along with the units specified by the user. For example, the first three entries of the Results screen 240 show that the level of Tank #4, as measured at analog input #1 of I/O Bridge #1, rose from 33.51 feet to 57.31 feet during the three-second time period indicated. Similarly, changes in the state of digital inputs #1 and #2 of I/O Bridge #2 were logged in at 5:19:56 and 5:19:57 on Mar. 30, 1992. Since the background INIT program generates the record of events monitored and controlled by the peripheral data acquisition, monitor, and adaptive control system, the logging of data will still take place when the user is working with an unrelated application program in the foreground.

Figure 4A:
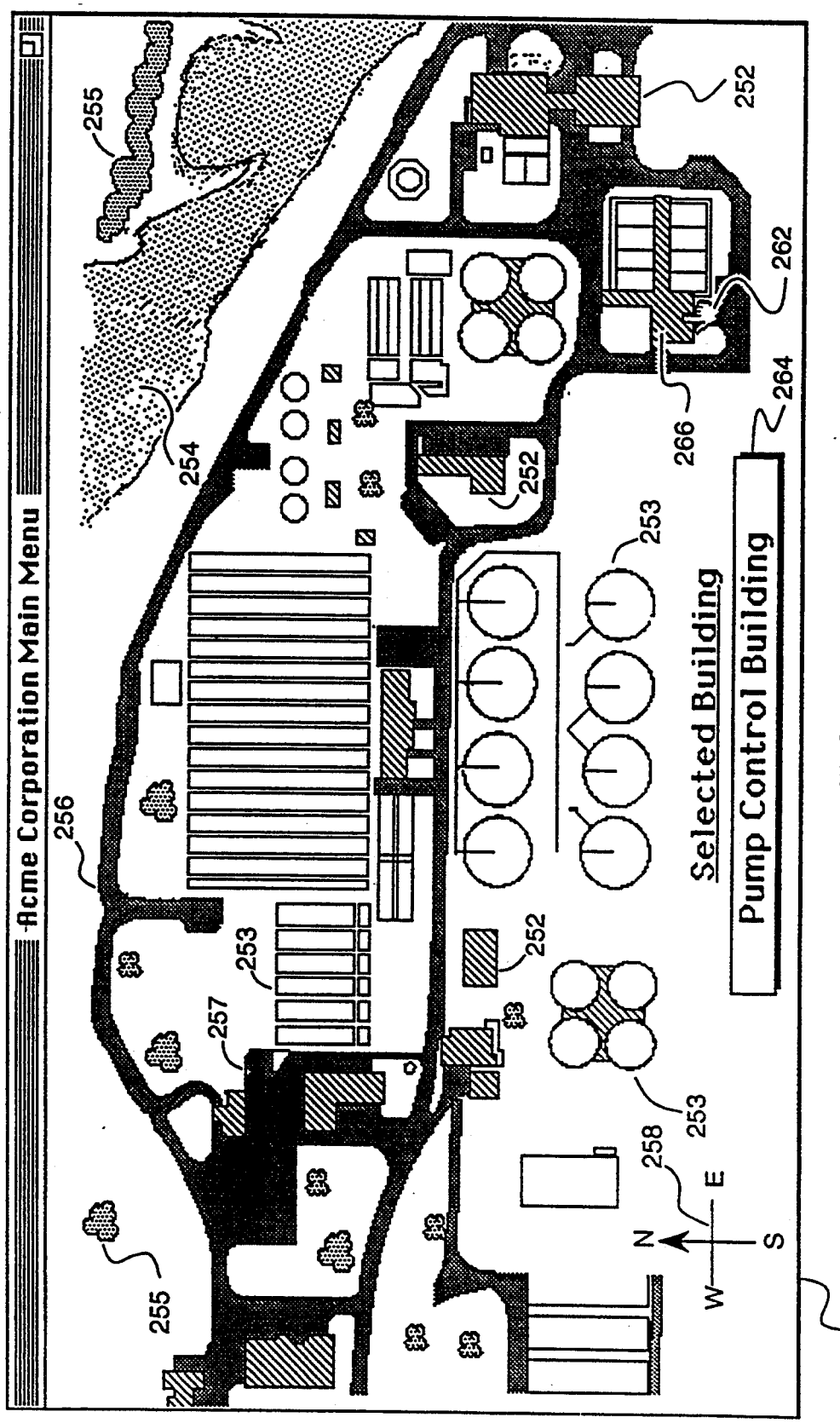
FIGS. 4A, 4B, 4C, 4D are pictorial representations of screen displays of an alternate embodiment of the present invention, wherein a sequence of pictorial location displays, such as overhead views or floorplans, is presented to orient the user as to the specific location of the device being controlled and/or monitored.

FIG. 4A is a representative screen display of an alternate embodiment of the present invention, illustrating a pictorial representation of the overall physical layout, i.e., a "bird's eye view," of all buildings or other structures having equipment under the control of the peripheral data acquisition, monitor, and adaptive control system. In this particular embodiment, the screen display 250 illustrates a graphical overview of a particular facility, i.e., that of Acme Corporation. The graphical overview of this embodiment was made by obtaining a blueprint of the Acme Corporation's campus layout and scanning it into the personal computer 12 using the HYPERSCAN scanner utility program. The overhead view was then incorporated into the a HYPERCARD stack (document) such that it would provide an overall perspective to the user of the entire control system, showing exactly where the buildings 252 or other structures 253 having equipment controlled by the system are physically located on the campus. The overhead view of FIG. 4A also shows the major features of the landscape, such as a river 254, trees 255, roadways 256, a parking lot 257, etc., as well as a North/South direction indicator 258.

As the user moves the mouse pointer 262 over various buildings, a particular building is highlighted and a text description 264 of that particular building appears across bottom of the screen. As shown in the figure, the user has selected the Pump Control Building 266 in the lower right corner of the screen, which corresponds to the Southeast corner of the campus. Each building may have, for example, several electronically-controlled devices and/or electronic subsystem configurations, all being controlled by the MASTER CONTROL program running on a single personal computer. When the user clicks the mouse button when the pointer is over the selected building, that particular structure is selected and input as a command to the MASTER CONTROL program, and the overview of FIG. 4A is replaced by a floorplan or other diagram of the specific building chosen.

Figure 4B:
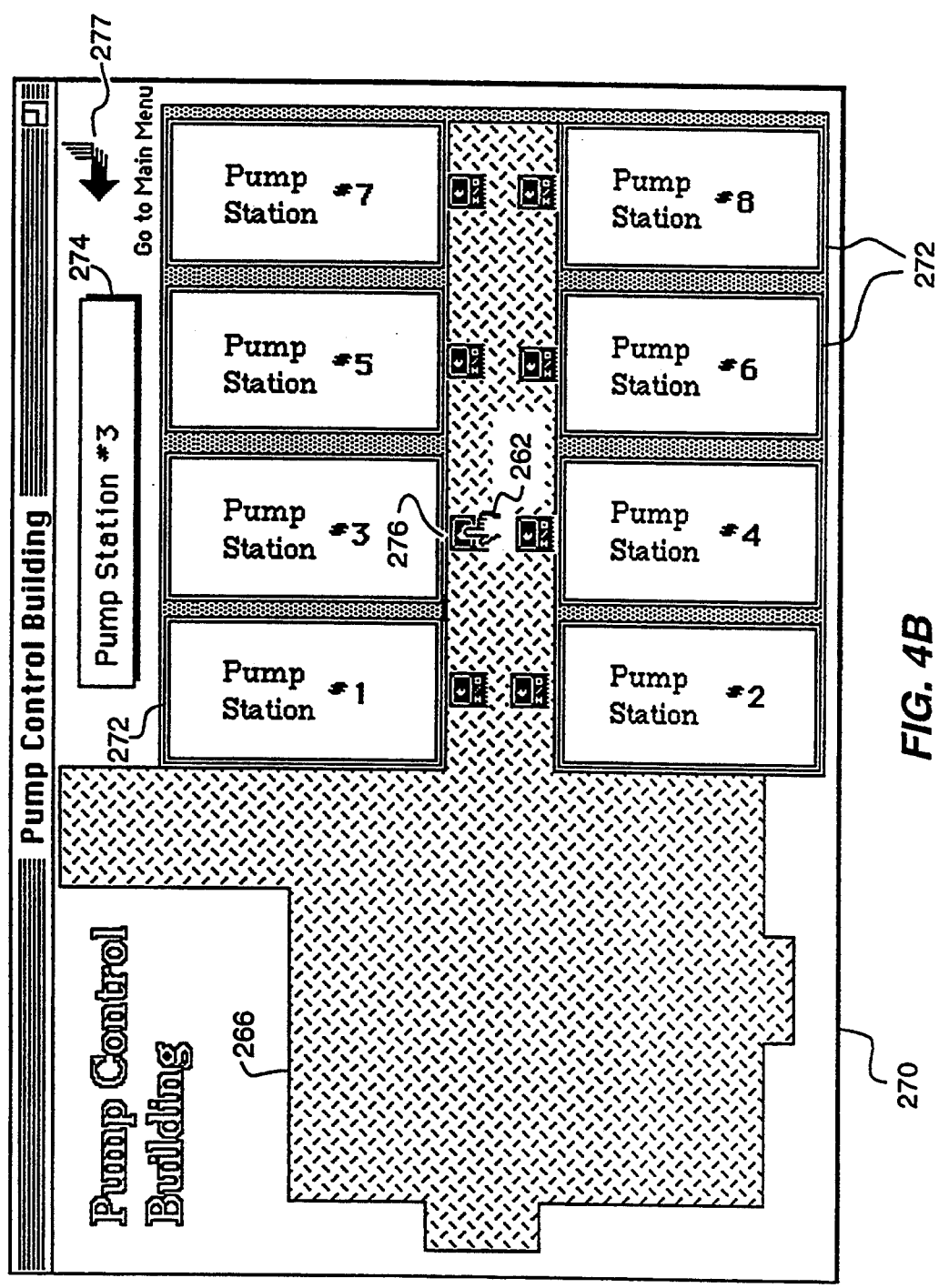

FIG. 4B represents graphical representation of a floorplan of the building or other structure selected by the user from FIG. 4A. In this example, floorplan 270 of the Pump Control Building 266 is shown. This floorplan presents an overhead view illustrating the name and location of each piece of equipment in the building using graphical icons 272. As the user moves the mouse pointer 262 over the various pieces of equipment, the individual pieces of equipment are highlighted and, if a text description of the selected piece of equipment is not already present, one will appear on the screen at 274. In this example, an icon 276 representing Pump Station #3 has been selected. Again, if the user clicks the mouse when the pointer 262 is on a specific piece of equipment, the floorplan of FIG. 4B is replaced by a control panel shown in FIG. 4C. A return button 277 is provided in the upper right hand corner of screen display 270 to allow the user to return to the previous screen.

Figure 4C:
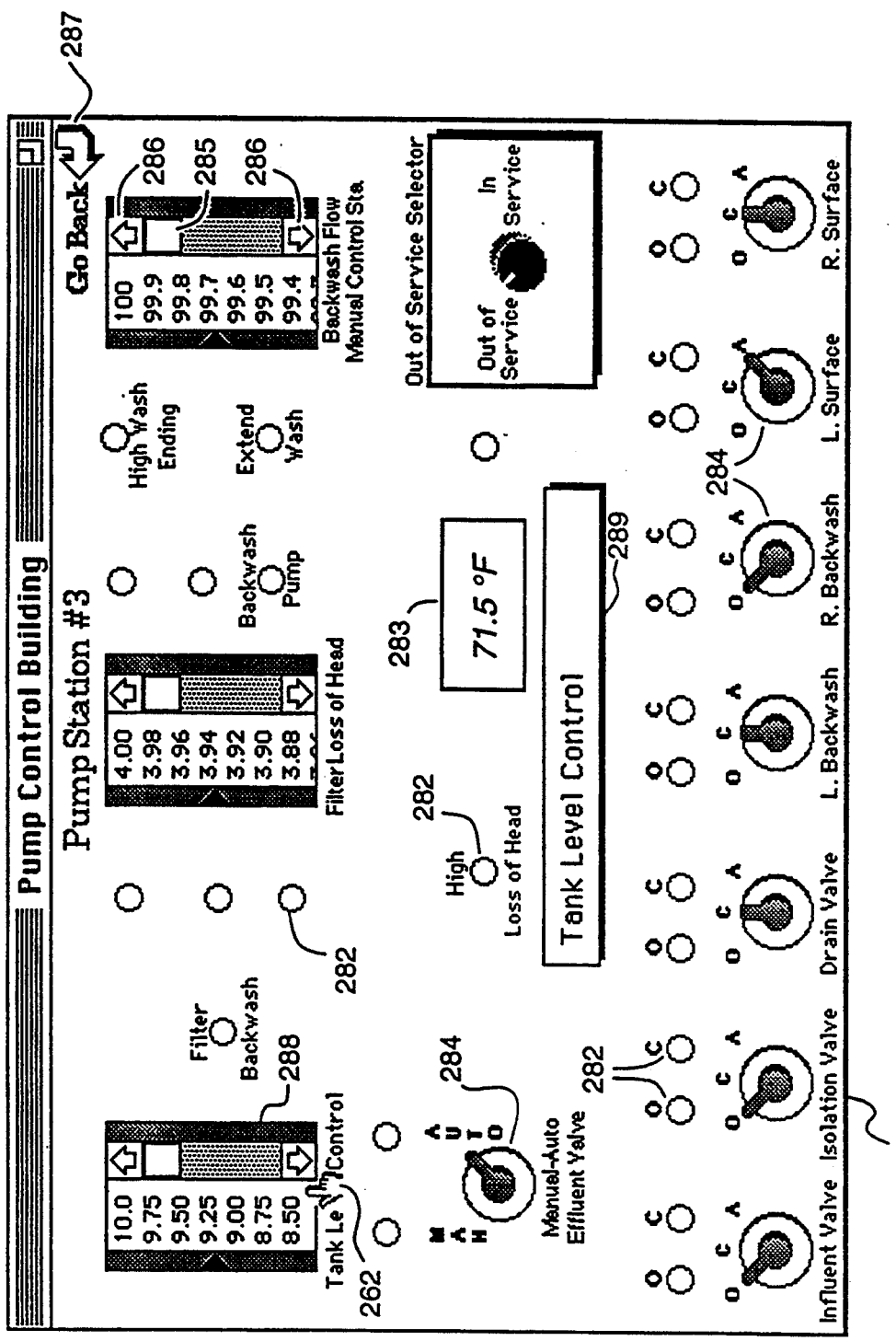

FIG. 4C represents a pictorial view of the control panel 280 for the specific piece of equipment chosen in FIG. 4B. In this example, the soft control panel for Pump Station #3 is presented, which allows the user of the personal computer to physically monitor and control the actual pump station from a remote location. The functional status of the piece of equipment is represented by having indicator lights 282 on the control panel being shown as colored or highlighted on the screen. Analog and digital readouts 283 from an actual control panel can also be duplicated on the screen and updated substantially in real time. The positions of control switches 284 are also shown on the screen, and can be changed by clicking on them with the mouse pointer. Analog settings on the screen can be changed by clicking and dragging the appropriate control button 285, or by clicking the up-down control arrows 286 on the screen. Again, a return button 287 is provided to return the user to the previous screen. The name of a particular control mechanism 288 on the control panel is also displayed in the name field 289 if desired. Hence, the soft control panel 270 presents the functional status of the particular piece of equipment selected by the user, and permits commands from the user to be input to the MASTER CONTROL program to perform the desired control action for the particular piece of equipment selected by the user.

Figure 4D:
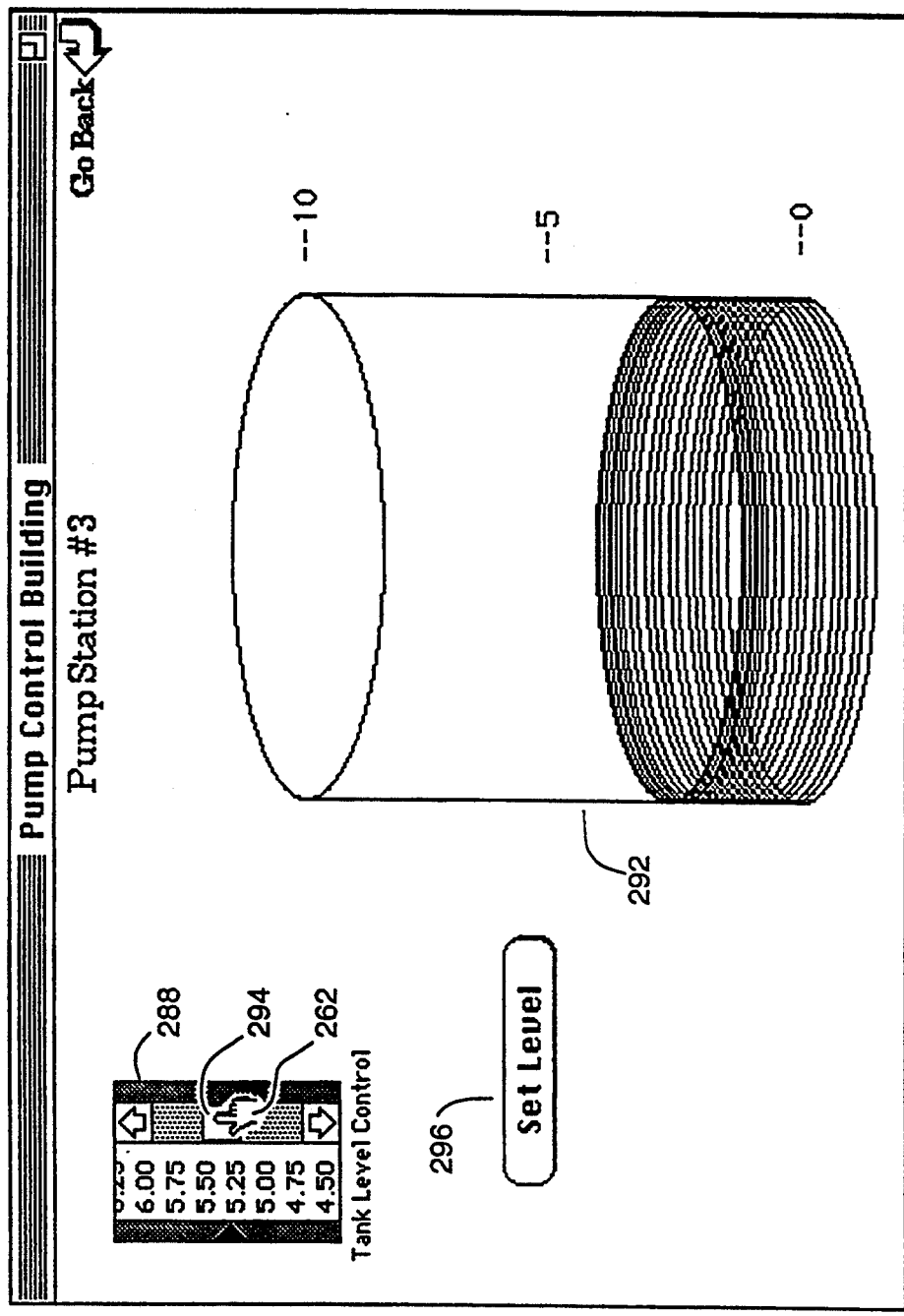

FIG. 4D illustrates a further enhancement to this embodiment of the invention, wherein the display screen 290 presents the functional status of the selected device on the same screen adjacent the particular control panel mechanism selected by the user. For example, once the user clicks anywhere on the tank level control mechanism 288 of FIG. 4C, the display screen 290 of FIG. 4D appears. This shows the tank level control mechanism 288 as well as a pictorial representation of the tank 292 itself using either screen animation or by showing live video from a closed-circuit television camera directly on the display screen. In other words, the animated or live view of the particular device being controlled presents the functional status of the controlled device in substantially real time. In the example shown in FIG. 4D, clicking and dragging on the tank level control button 294 with the mouse pointer 262, and then clicking on the Set Level button 296, would send a control signal to the actual control panel at Pump Station #3, such that the actual tank level would change correspondingly, and the change would appear via the pictorial representation of the tank 292 on the display screen 290.

Hence, the sequence of screen displays illustrated in FIGS. 4A–4D serve to orient the user of the system by showing a representation of the "big picture" of the system being controlled, then directing the user to the specific location of the individual I/O Bridge units and/or the functions that each I/O Bridge monitors and controls. In other words, the MASTER CONTROL program first illustrates zones or the physical location of groups of devices being monitored and controlled. Then the program shows the function of each device in the group. Next, commands are input by the user and output by the program to perform the desired control action. Finally, the status of each device is shown by having the various icons change appearance, or by having computer animation or live video represent the functional status of the particular device in virtually real time.

Figure 5A:
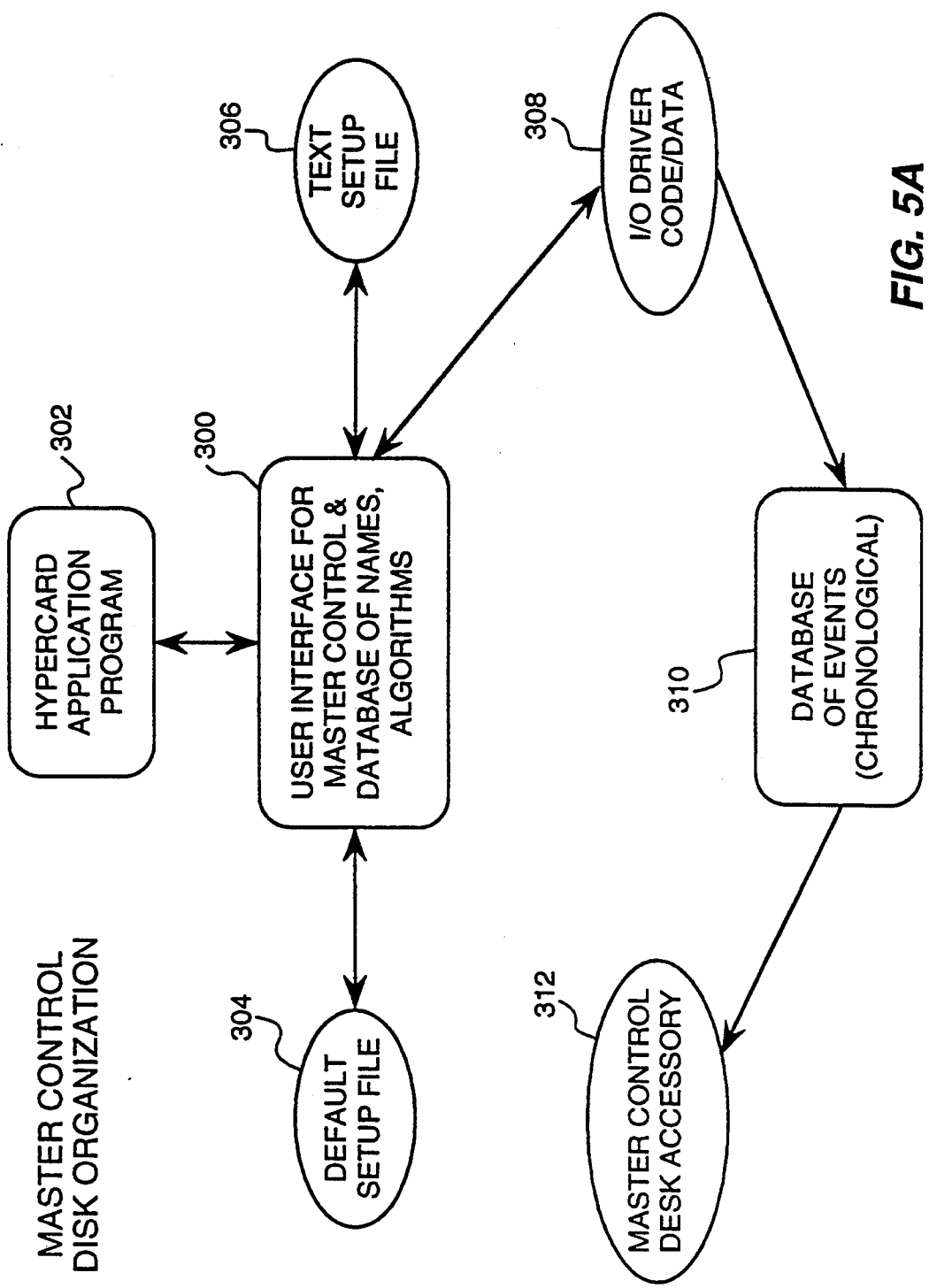
FIGS. 5A, 5B, 5C are pictorial flow diagrams showing the disk organization, memory map, and logic flow of the MASTER CONTROL program of the preferred embodiment.

FIG. 5A is a pictorial flow diagram representing an overview of the disk organization of the MASTER CONTROL program of the preferred embodiment. The disk organization diagram of FIG. 5A basically corresponds to a display of the directory of the files used for the MASTER CONTROL program, and closely resembles the Table of Contents for the object code listing included in the Appendix.

The MASTER CONTROL program was written using HYPERCARD (a trademark of Apple Computer, Inc.), which allows one to create, edit, and delete records, and to make decisions based on the content of particular records. Hence, the MASTER CONTROL program is ideally suited for use with the HYPERCARD application program serving as the database for peripheral data acquisition and adaptive control. However, the MASTER CONTROL program of the preferred embodiment can also be modified to be used with any Pascal program, Microsoft Basic program, or other computer program in which the user desires to perform the data acquisition, analysis, and/or adaptive control.

In FIG. 5A, the main block 300 is the User Interface file for the MASTER CONTROL program. The User Interface 300 is actually a document file including entry screens and executable script which contain information such as the names of inputs and outputs, the assignments of inputs to conditionals, the assignments of specific conditionals to outputs, etc. Due to the nature of HYPERCARD, the User Interface includes the Database of Names and Algorithms used by the MASTER CONTROL program.

Block 302 is the HYPERCARD application program, which must be used to open the User Interface document 300. When accessed by the HYPERCARD program, the User Interface scripts are executed and the entry screens appear on the display screen under the direction of the MASTER CONTROL program. Furthermore, data files can be read from and written to under the control of the script files.

The Default Setup file 304 is used to initialize the User Interface program to a known state having zero inputs, zero outputs, and no conditional algorithms. The Text Setup file 306 contains a complete database of inputs, outputs, and conditionals with all their corresponding names and linkages, which serves the purpose of providing a template for the MASTER CONTROL program.

The I/O Driver 308 or INIT file is the background program which interacts with the I/O Bridge devices. The INIT can run with or without the MASTER CONTROL program once the setup has been generated. Moreover, multiple INITs can be loaded and executed to control a plurality of I/O Bridge devices independently from one another. Accordingly, the I/O Driver code and data are stored in a file which can be accessed by the MASTER CONTROL program and which can create the record of events in the background. The Database of Events 310 represents the data file generated by the INITs when the user desires that the I/O channel states be logged to disk. This record of events is kept in chronological order as previously shown in FIG. 3L. Finally, the MASTER CONTROL Desk Accessory 312 provides a mechanism for accessing the Database of Events 310. The Desk Accessory can be accessed from any program.

Figure 5B:
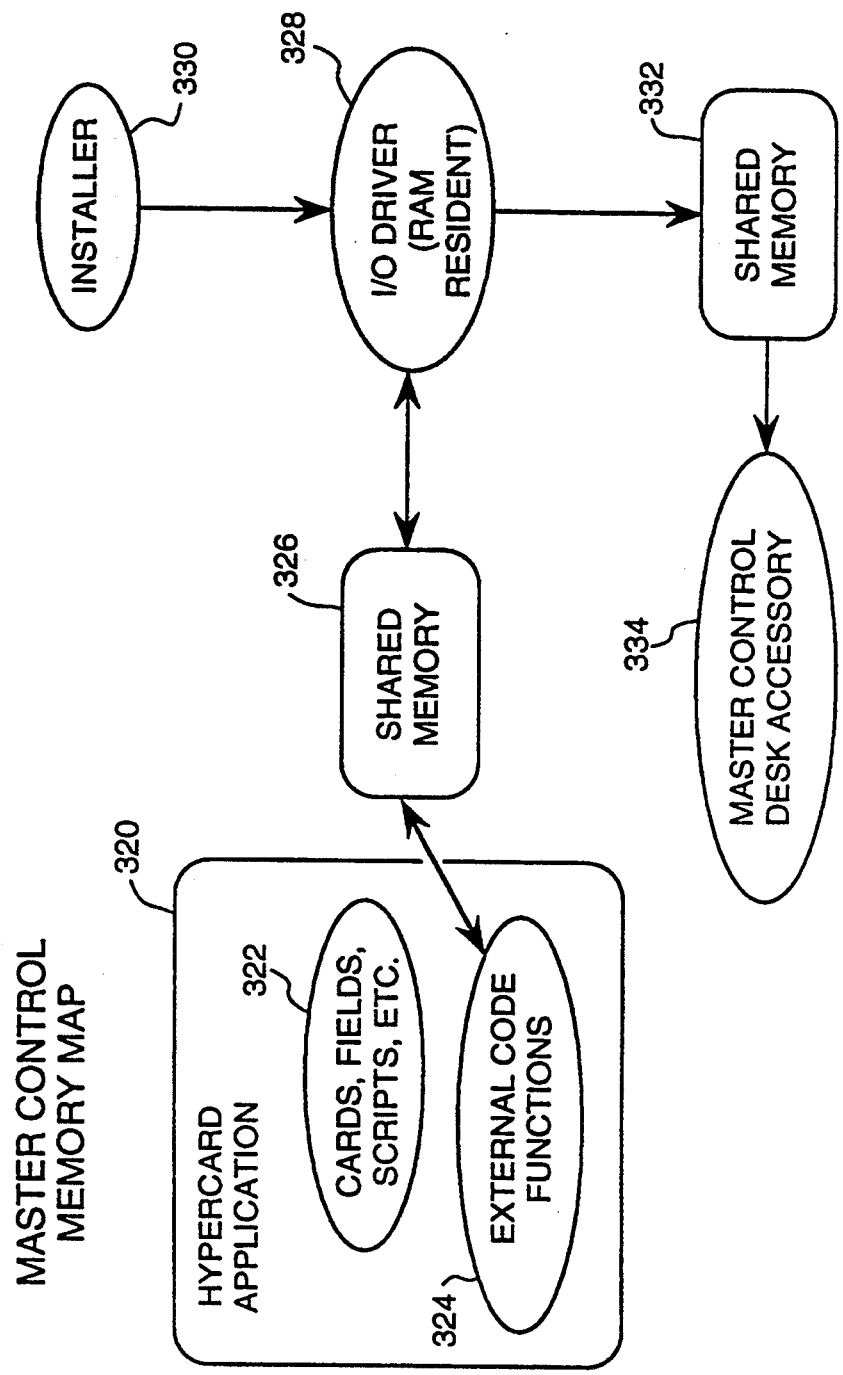

FIG. 5B represents a memory map for the MASTER CONTROL program. As will be appreciated by those persons familiar with the HYPERCARD application program 320, the program is organized in stacks which contain information such as the cards (records), fields, and scripts used by the MASTER CONTROL program. External code functions 324, or XFCNs, which are part of the HYPERCARD application 320, have access to a block of the personal computer's shared memory 326 as shown.

The I/O Driver program 328 or INIT, which is resident in the PC's RAM, interfaces with the HYPERCARD application 320 through the computer's shared memory 326. Another block of shared memory 332 is used by the INIT to interface with the MASTER CONTROL Desk Accessory 334. An Installer program 330 is initially run to load and configure the INIT.

Figure 5C:
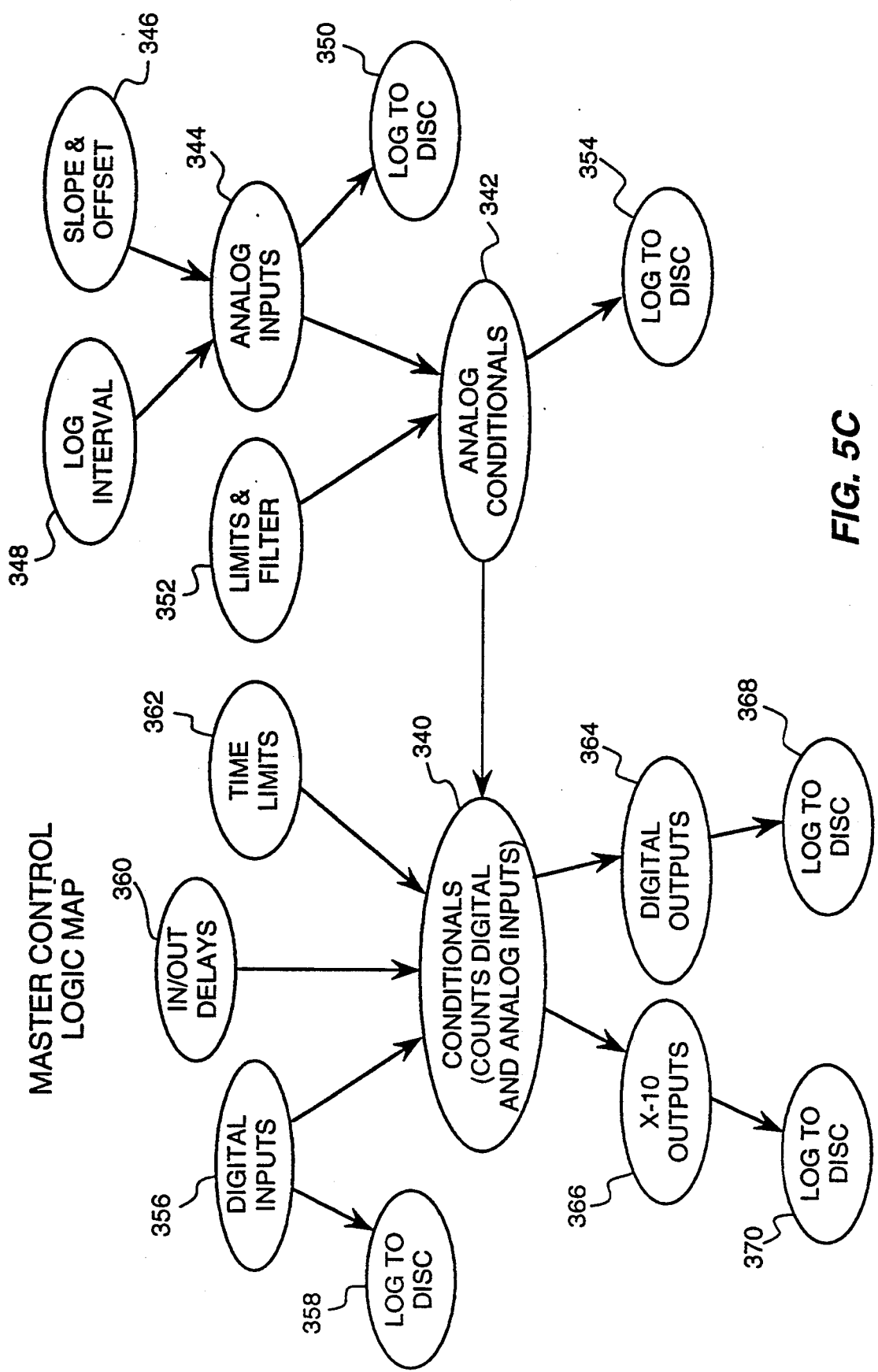

Turning now to FIG. 5C, a logic map flow diagram is shown for the MASTER CONTROL program. This diagram illustrates how the MASTER CONTROL program provides the ability to let the user set up the system configuration utilizing complex boolean logic statements (conditionals) with multiple inputs and multiple outputs, including both analog and digital inputs. The MASTER CONTROL program also allows the user to verify the operation of the conditional via emulation through manual control via the Manual Mode. For example, a conditional may be set up such that any two out of a certain three inputs trigger a particular output. These conditionals provide the ability to combine two or more independent and different levels of boolean logic condition statements at the same time, i.e., (A AND B) OR (B AND C) OR (A AND C)=Z.

Sophisticated time parameters can also be added as conditional statements, as discussed above in accordance with FIG. 3G.

The logic map of FIG. 5C illustrates that two types of conditionals are actually being constructed with the program: universal conditionals 340 and analog conditionals 342. The analog conditionals 342 are configured using the analog inputs 344. These analog inputs 344 must first be configured with their slope and offset parameters 346 and log interval parameters 348, and the decision whether or not the analog inputs are to be logged to disk at 350. The analog conditionals 342 are then constructed, utilizing the limits and filter parameters 352 discussed above. It is also determined at this time whether or not to log the resultant analog conditional to disk at 354 when it turns true.

Similarly, the universal conditional 340 is configured from both the digital inputs 356 and the analog conditionals 342. First, it is determined whether the digital inputs 356 should be logged to disk at 358. Then the digital inputs 356, the in/out delays 360, and the time limit parameters 362 are used along with the analog conditionals 342 to form the universal conditionals 340. Hence, the universal conditionals 340 include logic statements based on both digital and analog inputs. Once the universal conditionals 340 turn true, either the digital outputs 364 or the X-10 outputs 366 are activated and/or logged to disk at 368, 370.

As an example of the logic flow of the conditionals, say that the user desires that the system be set up such that any three out of a certain five inputs trigger a particular X-10 output, and one of the inputs is an analog input. Furthermore, the analog input would be activated only when it falls within a voltage range of 2.5 to 3.0 volts DC. Clearly, the boolean logic expression for this conditional statement would be very complex, requiring two or more levels of boolean operators. However, by following the logic map shown in FIG. 5C, the user would implement the screen displays of FIGS. 3A-3L to perform the following steps: select one analog input (FIG. 3E); scale the analog input signal to have a slope of 0.02 and an offset of 0 (FIG. 3E); set its limits to 2.5 and 3.0 volts DC (FIG. 3F); use an in-range filter (FIG. 3F); select four appropriate digital inputs (FIG. 3C); construct a conditional list including the four digital inputs and the one analog condition (FIG. 3G); configure the X-10 output (FIG. 3I); and set the output conditions needed to 3 (FIG. 3I). All of these steps can be performed in a matter of minutes with the MASTER CONTROL program.

Figures 1, 6E:
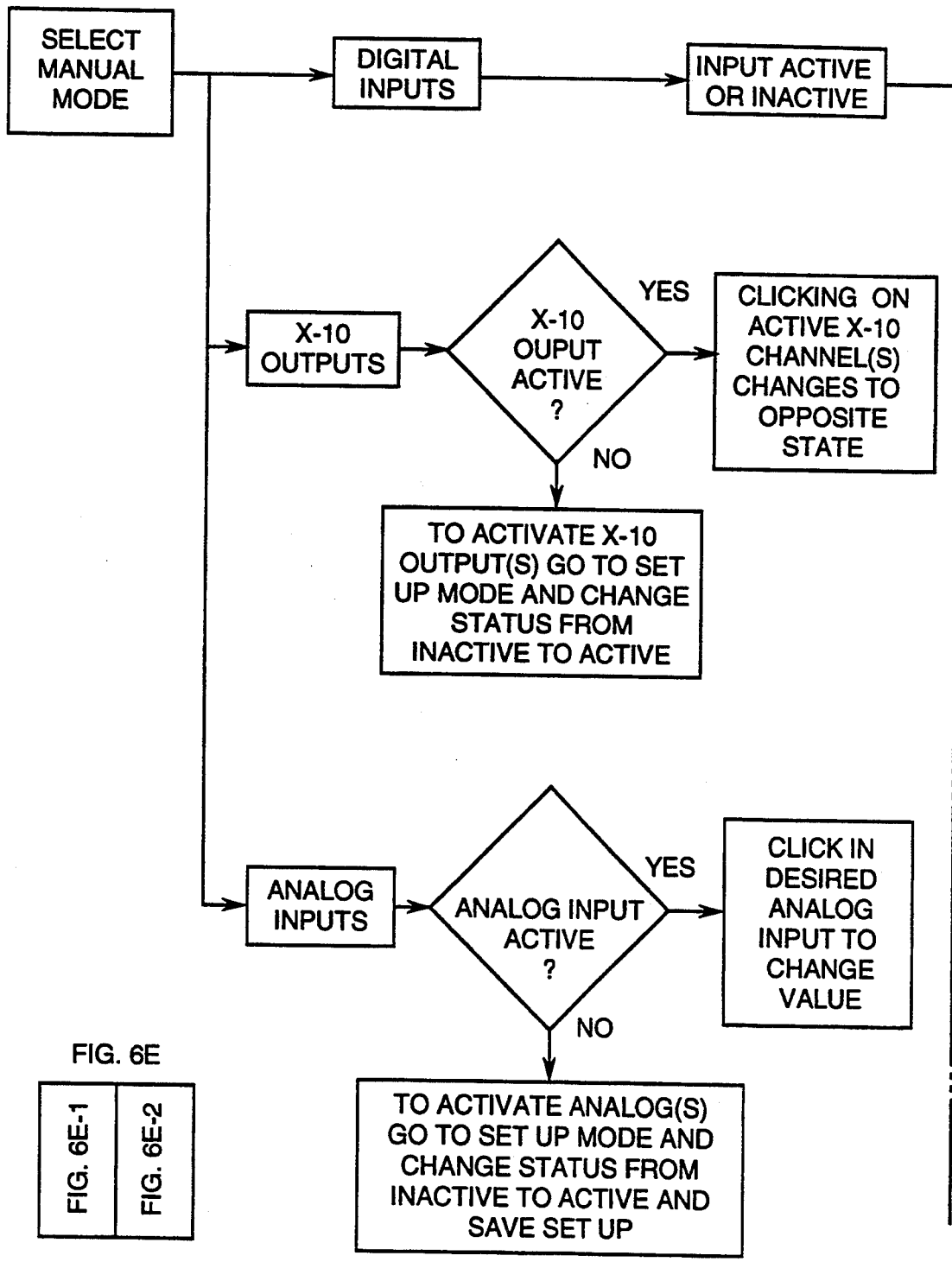
Figures 2, 6E:
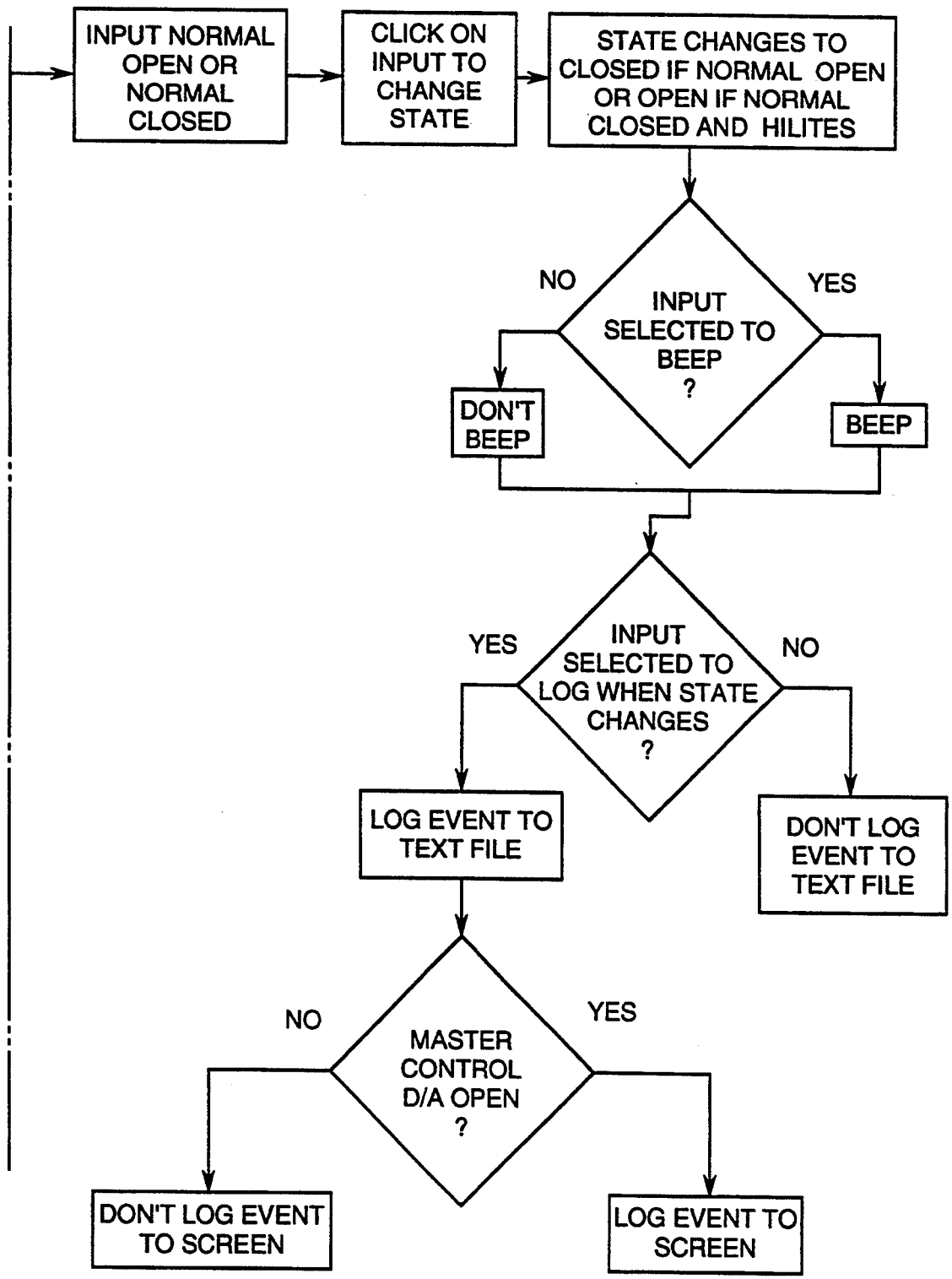
Figures 1, 6F:
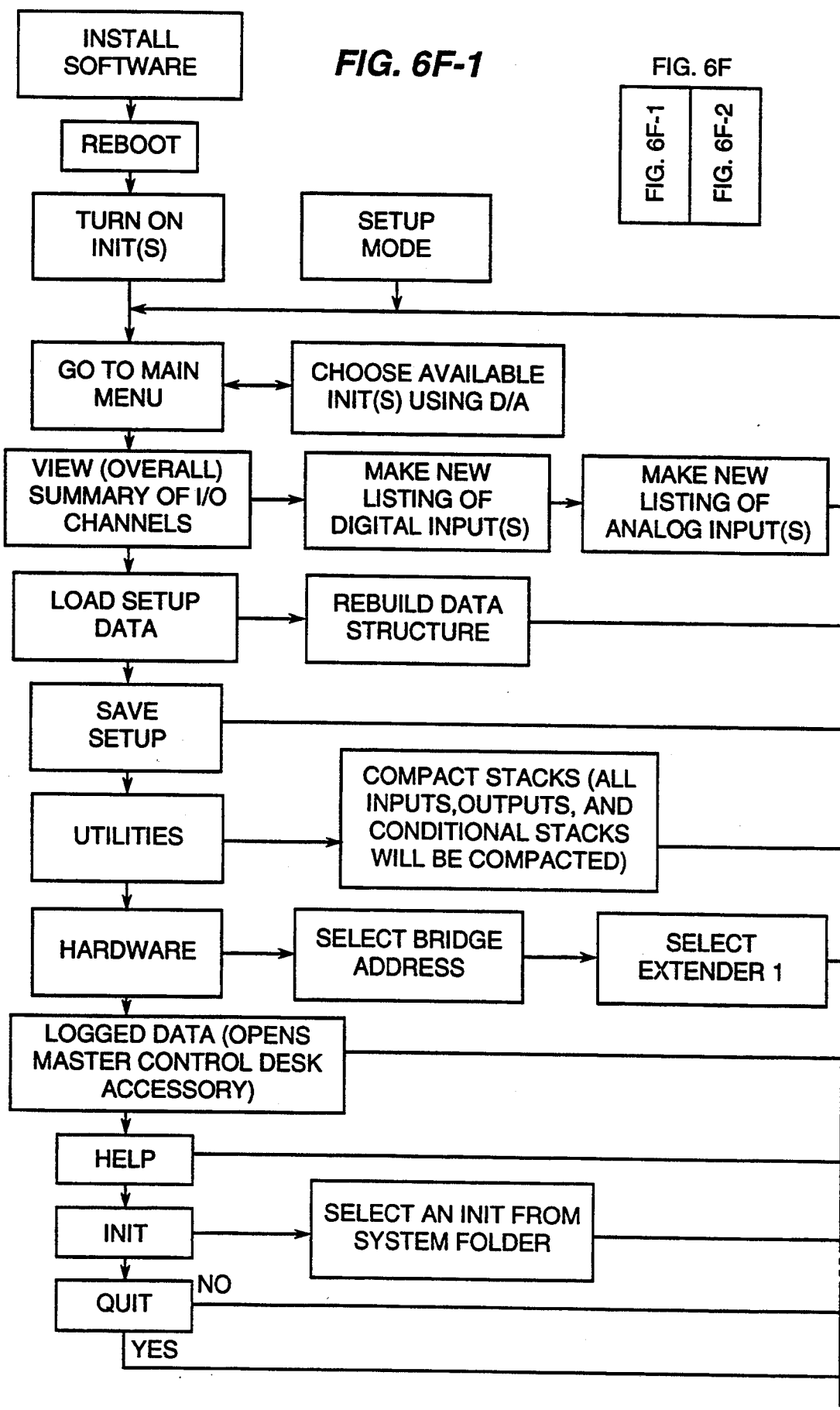
Figures 2, 6F:
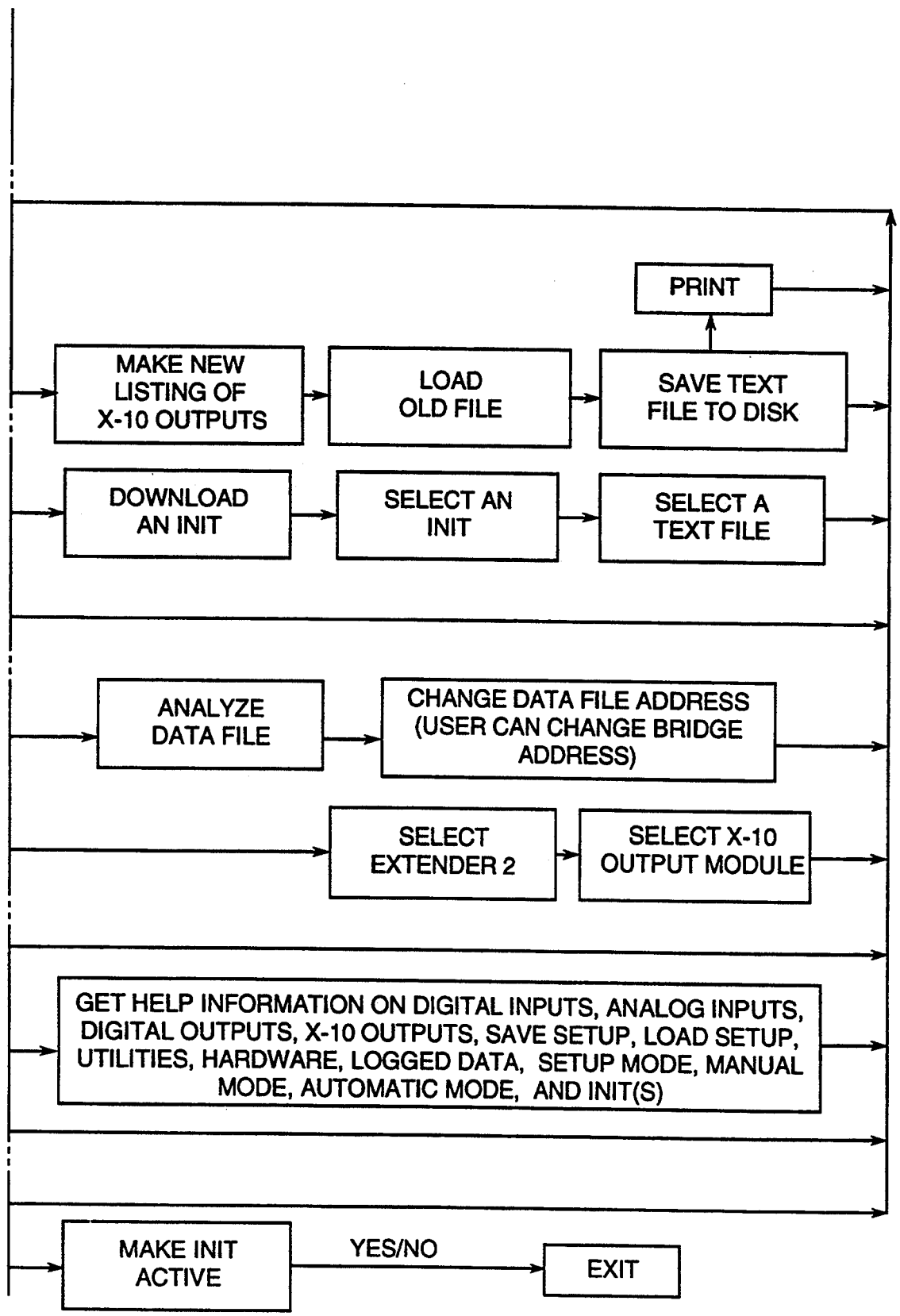

FIGS. 6A through 6F are software program flowcharts used for generating the screen displays of FIGS. 3A through 3L. More specifically, FIG. 6A is the system startup routine; FIG. 6B is the I/O Driver (INIT) routines; FIG. 6C is the HYPERCARD display screen routine for updating channel icons on screen in the automatic and manual mode; FIG. 6D is the MASTER CONTROL Desk Accessory routine; FIG. 6E is the system setup procedure from the user's perspective for the MASTER CONTROL program; and FIG. 6F is the overall system operational flow of the MASTER CONTROL program. The flowcharts of FIGS. 6A-6F follow the sequence of screen displays and flow diagrams described above, and are self-explanatory. Furthermore, the flowcharts correspond exactly to the computer object code listings set forth in the Appendix. Accordingly, a further description of these flowcharts is not deemed necessary.

Referring now to FIGS. 7A through 7E, software program flowcharts are shown for illustrating the operation of the MASTER CONTROL program when configured to present the screen displays of FIGS. 4A through 4D in accordance with the alternate embodiment of the present invention. Since the HYPERCARD program operates according to stacks, the operational flow would depend upon which stack is controlling the program.

Figure 7E:
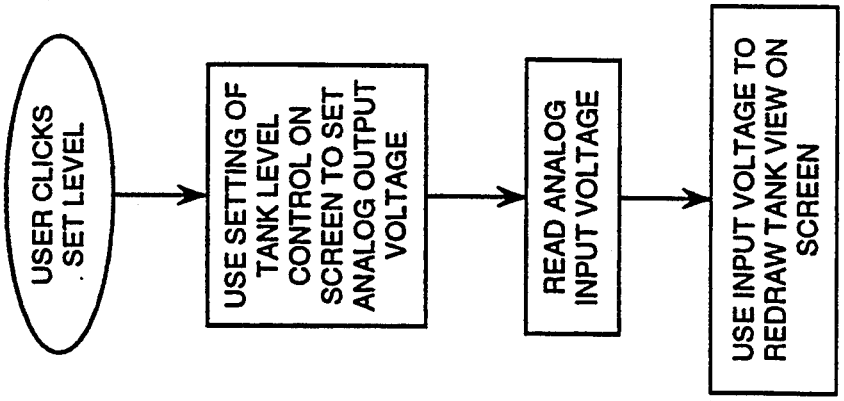
FIGS. 7A, 7B, 7C, 7D, 7E are software program flowcharts for operating the screen displays of FIGS. 4A–4D in accordance with the alternative embodiment.
Figure 7C:
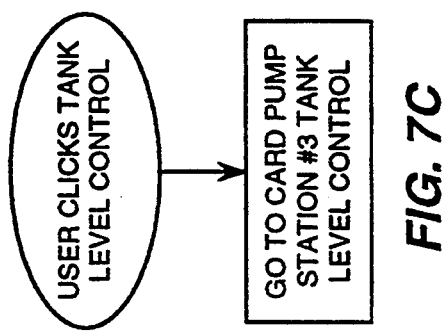
Figure 7D:
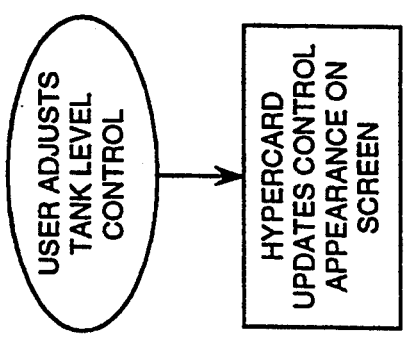
Figure 7A:
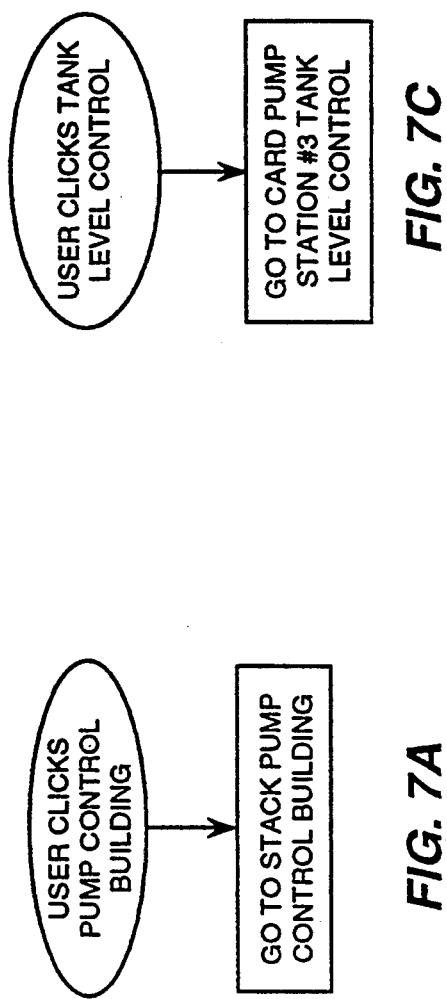
Figure 7B:
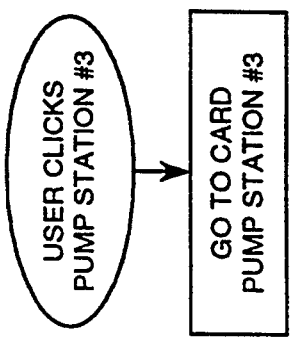

FIG. 7A shows the stack for the main menu of the alternate embodiment of the MASTER CONTROL program, wherein the display screen would appear as described in FIG. 4A. As can be seen from FIG. 7A, the user would select the Pump Control Building from the main menu by clicking the mouse, and the program would input the command and transfer control to the display screen of the Pump Control Building illustrated in FIG. 4B. In FIG. 7B, the user would click on Pump Station #3, and control would proceed to the control panel card for Pump Station #3 as illustrated in FIG. 4C. In FIG. 7C, the user would choose the tank level control, and control would then proceed to the Pump Station #3 tank level control card shown in FIG. 4D. In FIG. 7D, the user would adjust the tank level control by clicking and dragging the control with the mouse pointer. Then the program would update the appearance of the level control icon on the screen.

In FIG. 7E, the user can set the level of the tank by clicking on the Set Level button. Using this set level command, control proceeds to generate an analog output voltage via an I/O Bridge analog output channel connected to the real-world control panel. Similarly, the program reads an analog input voltage from an I/O Bridge analog input channel connected to a level sensor on the tank of Pump Station #3. This analog input voltage is then used to redraw the view of the tank on the display screen, in order to update its status. The program flowchart of FIG. 7E would be modified slightly in order to display a live video picture on the screen instead of a graphical representation of the tank. In either case, the system provides both monitoring and control of remotely-located equipment via the PC, while at the same time providing the user with an overall perspective of exactly where the pieces of equipment are physically located in the real world, exactly what types of equipment can be controlled, and exactly which piece of equipment is being controlled. Furthermore, the system provides visual feedback to the user in virtually real time, showing exactly how the particular piece of equipment is responding.

In review, it can now be seen that the present invention provides a peripheral data acquisition, monitor, and adaptive control system which allows the user to easily create, modify, and test complex control system configurations on a personal computer. The program can be configured to orient the user with respect to the physical location and function of the equipment being controlled by the system. The system's computer software program runs in the background even while an unrelated application program runs in the foreground, and the background program can execute sophisticated conditional statements to control an output, record events in real time, and display a recorded table of events on command. All of this can be accomplished using an I/O Bridge device which interfaces to the personal computer via the keyboard port and which performs data acquisition by emulation of keyboard keystrokes.

While only particular embodiments of the invention have been shown and described herein, it will be obvious that further modifications and improvements may be made by those skilled in the art. For example, the image displayed to the user does not need to be an exact representation of the overall geographic layout or real-world equipment as would be obtained from a photograph, blueprint, or live video picture, as described in some of the above embodiments. Instead, the displayed image need only substantially represent the geographic layout, physical location, or piece of equipment to the degree necessary to provide sufficient details and convey enough information to the user in order to accomplish the functions stated above. Accordingly, the appended claims are intended to cover all such modifications and alternative constructions that fall within the true scope and spirit of the invention.

What is claimed is:

1. A system for monitoring and controlling a plurality of remotely-located, electrically-controlled devices via a personal computer, each of said plurality of devices having at least two operational states, and having means for changing operational state in response to a device control signal, and further having means for providing a device monitor signal indicative of the operational state of each of said plurality of devices, each of said plurality of devices being physically located at a particular location within at least two geographically-separate sections of a predefined area, said system comprising:

personal computer means for executing a plurality of different software programs under user control, said personal computer means including a central processor, a display monitor, and means for inputting commands from the user;

interface means for interfacing said personal computer means to said plurality of electrically-controlled devices by translating said device monitor signals into code signals which are adapted to be interpreted by said personal computer means, and by providing said device control signals in response to command signals provided by said personal computer means; and program means for instructing said personal computer means to monitor and control said plurality of devices in accordance with the following steps:

(a) displaying an image to the user which substantially represents an overall geographic layout of the predefined area showing the separate sections of the predefined area within which said plurality of devices are located;

(b) inputting a command from the user which identifies a particular section of the predefined area selected by the user;

(c) displaying an image to the user which substantially represents the approximate physical locations of said plurality of devices located within the particular section selected by the user;

(d) inputting a command from the user which identifies at least one of the plurality of devices selected by the user;

(e) displaying an image to the user which substantially represents a control mechanism for at least the one particular device selected by the user;

(f) inputting a command from the user which corresponds to a desired control action for at least the one particular device selected by the user;

(g) outputting a command signal to the interface means to control at least the one particular device selected by the user in accordance with the desired control action; and (h) in response to said code signals from said interface means, displaying an image to the user which substantially represents the operational state of at least the one particular device selected by the user.

2. The system according to claim 1, wherein said means for inputting commands from the user includes a keyboard bus adapted to be coupled to a keyboard via a keyboard port, and wherein said personal computer means and said interface means communicate only via said keyboard bus.

3. The system according to claim 2, wherein said keyboard bus includes only four lines, and wherein one of said four lines is a bidirectional serial data bus line.

4. The system according to claim 2, wherein said personal computer means includes a keyboard coupled to said keyboard port, and further includes a pointing device for moving a cursor on the displayed image and selecting a particular portion of the displayed image.

5. The system according to claim 2, wherein said keyboard bus includes a bidirectional data line for normally providing two-way data communication between a keyboard and said personal computer means, said personal computer means adapted to communicate with said keyboard via said keyboard bus using a particular keycode format based upon the coding of keyboard keystroke information as individual sequential keyboard characters, said interface means being connected to said personal computer means via said keyboard port, said device monitor signals having a signal format not directly compatible with said particular keycode format, said code signals having a signal format which is directly compatible with said particular keycode format such that said code signals are adapted to be directly interpreted by said personal computer means as keyboard keystroke information.

6. The system according to claim 5, wherein said device monitor signals provided by said plurality of electrically-controlled devices include binary-based digital signals, and wherein said interface means includes means for translating said binary-based digital signals into text-character-based digital signals, and for translating said text-character-based digital signals into keyboard code signals which can be directly interpreted by said personal computer means.

7. The system according to claim 2, wherein said keyboard bus is compatible with an Apple Desktop Bus brand keyboard bus.

8. The system according to claim 1, wherein said program means further includes means for instructing said personal computer means to record communications between said interface means and said personal computer means.

9. The system according to claim 1, wherein said program means further includes means for generating and displaying a recorded list of changed operational states of said plurality of electrically-controlled devices.

10. The system according to claim 1, wherein said plurality of devices are located in a plurality of geographically-separate structures, wherein the displayed image of step (a) substantially represents an overall physical layout of the plurality of structures, and wherein the displayed image of step (c) substantially represents the approximate physical locations of said plurality of devices located within the particular structure selected by the user.

11. The system according to claim 1, wherein said device monitor signals provided by said electrically-controlled devices include an analog signal, wherein said interface means includes an analog-to-digital converter, wherein the displayed image of step (h) substantially represents the operational state of a particular device, said displayed image of step (h) changing in response to changes of said analog signal.

12. The system according to claim 1, wherein said device monitor signals provided by said electrically-controlled devices include a video signal, wherein the displayed image of step (h) substantially represents the operational state of a particular device, said displayed image of step (h) changing in response to changes of said video signal.

13. A system for monitoring and controlling at least one of a plurality of remotely-located, electrically-controlled devices via a personal computer, each of said devices having at least two operational states, and having means for changing said operational state in response to a device control signal, and further having means for providing a device monitor signal indicative of the operational state of said device, said system comprising:

personal computer means for executing a plurality of different software programs under user control, said personal computer means including a central processor, a display monitor, and a keyboard bus adapted to be coupled to a keyboard via a keyboard port, said keyboard bus including a bidirectional data line for normally providing two-way data communication between said keyboard and said personal computer means;

interface means for interfacing said personal computer means to at least one of said electrically-controlled devices, said interface means connected to said personal computer means via said keyboard port, said interface means including means for translating said device monitor signals into keyboard code signals which are adapted to be interpreted by said personal computer means, and for providing said device control signals in response to command instructions provided by said personal computer means; and program means for instructing said personal computer means to monitor and control said plurality of devices in accordance with the following steps:

(a) displaying an image to the user representing a control mechanism for at least one of said plurality of devices;

(b) inputting a command from the user which corresponds to a desired control action for said device;

(c) transmitting command instructions to said interface means via said keyboard port, said command instructions containing information to control said device in accordance with the desired control action;

(d) receiving said keyboard code signals from said interface means via said keyboard port, said keyboard code signals containing information indicative of the operational state of said device; and (e) displaying an image to the user representing the operational state of said device.

14. The system according to claim 13, wherein said personal computer means and said interface means communicate only via said keyboard port.

15. The system according to claim 13, wherein said program means further includes means for instructing said personal computer means to record communications between said interface means and said personal computer means.

16. The system according to claim 13, wherein said personal computer means is adapted to communicate with said keyboard via said keyboard bus using a particular keycode format based upon the coding of keyboard keystroke information as individual sequential keyboard characters, said device monitor signals having a signal format not directly compatible with said particular keycode format, said keyboard code signals having a signal format which is directly compatible with said particular keycode format such that said keyboard code signals are adapted to be directly interpreted by said personal computer means as keyboard keystroke information.

17. The system according to claim 16, wherein said keyboard bus includes only four lines, and wherein one of said four lines is a bidirectional serial data bus line.

18. The system according to claim 16, wherein said keyboard bus is compatible with an Apple Desktop Bus brand keyboard bus.

19. The system according to claim 16, wherein said device monitor signals provided by said plurality of electrically-controlled devices include binary-based digital signals, and wherein said interface means includes means for translating said binary-based digital signals into text-character-based digital signals, and for translating said text-character-based digital signals into keyboard code signals which can be directly interpreted by said personal computer means.

20. The system according to claim 19, wherein said personal computer means includes means for executing at least one application program, and wherein said program means instructs said personal computer means to interpret and input said keyboard code signals directly into said application program as individual sequential keyboard character keystroke information.

21. The system according to claim 13, wherein said device monitor signals from said electrically-controlled devices include an analog signal, wherein said interface means includes an analog-to-digital converter, and wherein said personal computer displays an image corresponding to the operational state of a particular device, said displayed image changing in response to changes of said analog signal.

22. A method of monitoring and controlling at least one peripheral electronic device by a computer having a keyboard port, the monitoring and controlling being performed through said keyboard port, said method comprising the steps of:

(a) receiving an input signal from said peripheral electronic device;

(b) translating said input signal into a keyboard code signal which emulates individual sequential keyboard character keystroke information and which is adapted to be interpreted by said computer as keyboard keystroke information;

(c) transmitting said keyboard code signal to said computer using only said keyboard port;

(d) determining a particular keyboard command in said computer in response to said keyboard code signal, and providing corresponding keyboard command data to said keyboard port;

(e) receiving said keyboard command data from said computer using only said keyboard port;

(f) executing said keyboard command data and providing an output signal in response which can be interpreted by said peripheral electronic device; and (g) transmitting said output signal to said peripheral electronic device.

23. The method according to claim 22, wherein said input signals provided by said peripheral electronic device includes binary-based digital signals, and wherein said translating step includes the steps of:

(i) translating said binary-based digital signals into text-character-based digital signals; and (ii) translating said text-character-based digital signals into keyboard code signals which can be directly interpreted by said computer.

24. The method according to claim 22, wherein said input signals provided by said peripheral electronic device includes analog signals, and wherein said translating includes the steps of:

(i) converting said analog signals into binary-based digital signals;

(ii) translating said binary-based digital signals into text-character-based digital signals; and (iii) translating said text-character-based digital signals into keyboard code signals which can be directly interpreted by said computer.

25. A method for adaptively monitoring and controlling a plurality of remotely-located, electrically-controlled devices, each of said devices having a plurality of operational states, and having means for changing the operational state in response to a device control signal, and further having means for providing device monitor signals indicative of said operational state, said electrically-controlled devices connected to at least one interface unit for interfacing said devices to a computer, said interface unit including means for translating said device monitor signals into keyboard code signals which are adapted to be interpreted by said computer, and for providing said device control signals in response to command instructions provided by said computer, said computer including a central processor, a display monitor, and a keyboard bus adapted to be coupled to a keyboard via a keyboard port, said keyboard bus including a bidirectional data line for normally providing two-way data communication between said keyboard and said computer, said computer adapted to communicate with said keyboard via said keyboard bus using a particular keycode format based upon the coding of keyboard keystroke information as individual sequential keyboard characters, said interface unit connected to said computer via said keyboard port, said device monitor signal having a signal format not directly compatible with said particular keycode format, said method comprising the steps of:

(a) interacting with a user to configure a device control program for monitoring and controlling said plurality of remotely-located, electrically-controlled devices in response to information derived from said device monitor signals;

(b) storing said device control program in memory;

(c) receiving said keyboard code signals from said interface unit via said keyboard port, said keyboard code signals containing information derived from said device monitor signals which have been translated into a signal format which is directly compatible with said particular keycode format;

(d) determining a particular command instruction in said computer in response to both said stored device control program and said keyboard code signals; and (e) transmitting said particular command instruction to said interface unit via said keyboard port, said command instruction containing information to control a particular device selected by the user in accordance with the desired control action.

26. The method according to claim 25, further comprising the step of:

displaying an image to the user representing the operational state of at least a particular device selected by the user.

27. The method according to claim 25, wherein said computer includes means for executing at least one software program under user control, and for executing at least one device control program independent of user control, and wherein said receiving step, said determining step, and said transmitting step are performed by said device control program being executed independent of user control.

28. The method according to claim 27, wherein said computer includes means for executing a plurality of device control programs independent of user control, each device control program associated with certain electrically-controlled devices, each device control program performing said receiving step, said determining step, and said transmitting step independently of each other.

29. The method according to claim 25, wherein said keyboard code signals contain information corresponding to the operational states of more than one of said plurality of electrically-controlled devices, wherein said interacting step includes the step of configuring said device control program to control at least one of said plurality of devices in response to a logical combination of operational states of a plurality of devices, and wherein said determining step includes the step of determining a particular command instruction according to said logical combination.

30. The method according to claim 29, wherein said logical combination of operational states of a plurality of devices includes two or more independent groups of boolean logic condition statements, each group having at least one boolean logic operator.

31. The method according to claim 29, wherein said device monitor signals from said electrically-controlled devices include an analog signal, and wherein said logical combination of operational states of said devices includes an analog condition statement having at least one parameter based upon the value of said analog signal.

32. The method according to claim 25, wherein said device control program includes at least three operational modes including a set-up mode, a manual mode, and an automatic mode, and wherein said interacting step further comprises the steps of:

(i) in the set-up mode, presenting a series of display screens to assist the user in determining which device control signals are associated with which device monitor signals and with which of said plurality of electrically-controlled devices;

(ii) in the manual mode, providing the user with the ability to manually change the operational state of at least one electrically-controlled device by overriding said keyboard code signals input from said keyboard port for a particular device selected by the user with a manually-changed keyboard code signal, and presenting at least one display screen having a representation of the current operational state of the selected device based upon the manually-changed signal; and (iii) in the automatic mode, displaying the current operational state of at least one electrically-controlled device.

33. The method according to claim 32, wherein at least one of said plurality of electrically-controlled devices includes means for providing analog device monitor signals, wherein said interface unit includes means for translating said analog device monitor signals into keyboard code signals, and wherein said interacting step, in the manual mode of operation, further comprises the steps of:

(i) providing the user with the ability to manually change the operational state of said device by overriding said keyboard code signals with a manually-changed keyboard code signal which corresponds to a specific analog signal value determined by the user; and (ii) presenting at least one display screen having a representation of the current operational state of the device based upon the manually-changed signal.

34. The method according to claim 32, wherein said interacting step, in the manual mode of operation, provides the user with the ability to emulate system operation by manual control of device output signals in substantially real time.

* * * * *

UNITED STATES PATENT AND TRADEMARK OFFICE
CERTIFICATE OF CORRECTION

PATENT NO. : 5,386,360
DATED : January 31, 1995
INVENTOR(S) : Wilson et al.

It is certified that error appears in the above-indentified patent and that said Letters Patent is hereby corrected as shown below:

TITLE PAGE, ITEM [73]:

The Assignee should be identified as "Ansan Industries Ltd., Rockford, Ill., a part interest".

Signed and Sealed this

Twenty-sixth Day of September, 1995

Attest:

BRUCE LEHMAN

*Attesting Officer*                    *Commissioner of Patents and Trademarks*